United States Patent
He et al.

(10) Patent No.: US 10,438,046 B2
(45) Date of Patent: Oct. 8, 2019

(54) MULTIFUNCTION FINGERPRINT SENSOR HAVING OPTICAL SENSING AGAINST FINGERPRINT SPOOFING

(71) Applicant: SHENZHEN GOODIX TECHNOLOGY CO., LTD., Shenzhen (CN)

(72) Inventors: Yi He, San Diego, CA (US); Bo Pi, Carlsbad, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/341,993

(22) Filed: Nov. 2, 2016

(65) Prior Publication Data
US 2017/0124370 A1    May 4, 2017

Related U.S. Application Data

(60) Provisional application No. 62/249,832, filed on Nov. 2, 2015.

(51) Int. Cl.
| | | |
|---|---|---|
| *G06K 9/28* | (2006.01) | |
| *G06K 9/00* | (2006.01) | |
| *G06F 3/041* | (2006.01) | |

(52) U.S. Cl.
CPC .......... *G06K 9/001* (2013.01); *G06F 3/0416* (2013.01); *G06K 9/0002* (2013.01);
(Continued)

(58) Field of Classification Search
CPC ... G06K 9/00107–0012; G06K 9/0002; G06K 9/00013–9/0012; G06K 9/0006–0012
See application file for complete search history.

(56) References Cited

U.S. PATENT DOCUMENTS

| | | | |
|---|---|---|---|
| 5,420,936 A * | 5/1995 | Fitzpatrick | G06F 21/32 340/5.53 |
| 5,726,443 A | 3/1998 | Immega et al. | |

(Continued)

FOREIGN PATENT DOCUMENTS

| | | |
|---|---|---|
| CN | 1417751 A | 5/2003 |
| CN | 101276406 A | 10/2008 |

(Continued)

OTHER PUBLICATIONS

International Search Report from PCT/CN2017/095908 dated Nov. 7, 2017 (6 pages).

(Continued)

*Primary Examiner* — Brian Werner
(74) *Attorney, Agent, or Firm* — Perkins Coie LLP

(57) ABSTRACT

The disclosed technology provides optical anti-proofing techniques in fingerprints sensing in devices or systems that use fingerprint identification for controlling access. The disclosed technology uses a fingerprint sensor to detect a contact input associated with a source of a fingerprint; generates an image signal from the fingerprint sensor responsive to the detected contact input that is indicative of one or more images of the fingerprint; uses an optical biometric sensor that is separate from the fingerprint sensor to generate a biometric marker detection signal indicative of a biometric marker different from the fingerprint; and processes, by processing circuitry, the generated image signal and the biometric marker detection signal to determine whether the detected contact and the associated one or more fingerprint images are from a finger of a live person who makes the contact input.

22 Claims, 24 Drawing Sheets

(52) U.S. Cl.
CPC ........ *G06K 9/0004* (2013.01); *G06K 9/0012* (2013.01); *G06K 9/00892* (2013.01); *G06K 9/00899* (2013.01); *G06F 2203/04106* (2013.01)

(56) References Cited

U.S. PATENT DOCUMENTS

| | | | |
|---|---|---|---|
| 5,953,441 | A | 9/1999 | Setlak |
| 6,292,576 | B1 | 9/2001 | Brownlee |
| 6,327,376 | B1* | 12/2001 | Harkin .............. G01B 7/004 356/71 |
| 7,535,468 | B2 | 5/2009 | Uy |
| 7,728,959 | B2 | 6/2010 | Waldman et al. |
| 7,936,907 | B2 | 5/2011 | Maurer et al. |
| 9,829,614 | B2 | 11/2017 | Smith et al. |
| 9,946,375 | B2 | 4/2018 | Akhavan et al. |
| 9,990,533 | B2 | 6/2018 | Pi et al. |
| 2003/0044051 | A1 | 3/2003 | Fujieda |
| 2003/0090650 | A1 | 5/2003 | Fujieda |
| 2006/0115128 | A1* | 6/2006 | Mainguet .......... G06K 9/00026 382/115 |
| 2007/0109438 | A1 | 5/2007 | Duparre et al. |
| 2007/0147667 | A1 | 6/2007 | Sumita et al. |
| 2007/0211926 | A1 | 9/2007 | Shinzaki et al. |
| 2008/0121442 | A1 | 5/2008 | Boer et al. |
| 2008/0122803 | A1 | 5/2008 | Izadi et al. |
| 2008/0237766 | A1 | 10/2008 | Kim |
| 2009/0021487 | A1 | 1/2009 | Tien |
| 2009/0232367 | A1 | 9/2009 | Shinzaki |
| 2010/0008552 | A1 | 1/2010 | Shin et al. |
| 2010/0113952 | A1 | 5/2010 | Raguin et al. |
| 2010/0321152 | A1 | 12/2010 | Argudyaev et al. |
| 2011/0233383 | A1 | 9/2011 | Oku |
| 2012/0019744 | A1 | 1/2012 | Lee |
| 2012/0069042 | A1 | 3/2012 | Ogita et al. |
| 2012/0105614 | A1 | 5/2012 | Wu et al. |
| 2012/0182266 | A1* | 7/2012 | Han .................. G06F 3/0425 345/175 |
| 2013/0051635 | A1 | 2/2013 | Wu et al. |
| 2013/0120760 | A1 | 5/2013 | Raguin et al. |
| 2013/0222282 | A1 | 8/2013 | Huang et al. |
| 2013/0287272 | A1* | 10/2013 | Lu ..................... G06F 3/041 382/124 |
| 2014/0036168 | A1 | 2/2014 | Ludwig |
| 2014/0125788 | A1 | 5/2014 | Wu |
| 2014/0168167 | A1 | 6/2014 | Chou |
| 2014/0218327 | A1 | 8/2014 | Shi et al. |
| 2014/0354905 | A1* | 12/2014 | Kitchens ............. G06F 1/3215 349/12 |
| 2014/0368764 | A1 | 12/2014 | Lee et al. |
| 2015/0078633 | A1 | 3/2015 | Hung |
| 2015/0220767 | A1 | 8/2015 | Yoon et al. |
| 2016/0004899 | A1 | 1/2016 | Pi et al. |
| 2016/0026844 | A1 | 1/2016 | Kim et al. |
| 2016/0042216 | A1 | 2/2016 | Yang et al. |
| 2016/0104025 | A1 | 4/2016 | Thompson et al. |
| 2016/0132712 | A1 | 5/2016 | Yang et al. |
| 2016/0180146 | A1* | 6/2016 | Setterberg ............ G06F 3/044 382/124 |
| 2016/0224816 | A1* | 8/2016 | Smith .................. G02B 27/58 |
| 2016/0247010 | A1 | 8/2016 | Huang et al. |
| 2016/0254312 | A1 | 9/2016 | Lee |
| 2016/0364036 | A1 | 12/2016 | Deng et al. |
| 2017/0017824 | A1 | 1/2017 | Smith et al. |
| 2017/0124370 | A1 | 5/2017 | He et al. |
| 2017/0220838 | A1 | 8/2017 | He et al. |
| 2017/0220842 | A1 | 8/2017 | Thompson |
| 2017/0220844 | A1 | 8/2017 | Jones et al. |
| 2017/0270340 | A1 | 9/2017 | Gao et al. |
| 2017/0270342 | A1 | 9/2017 | He et al. |
| 2018/0000500 | A1 | 1/2018 | He et al. |
| 2018/0075283 | A1 | 3/2018 | You et al. |
| 2018/0017334 | A1 | 6/2018 | Pi et al. |
| 2018/0188422 | A1 | 7/2018 | Fujii et al. |

FOREIGN PATENT DOCUMENTS

| | | |
|---|---|---|
| CN | 101416202 A | 4/2009 |
| CN | 202120281 U | 1/2012 |
| CN | 102411878 A | 4/2012 |
| CN | 103049138 A | 4/2013 |
| CN | 103458073 A | 12/2013 |
| CN | 103699884 A | 4/2014 |
| CN | 103942537 A | 7/2014 |
| CN | 104155785 A | 11/2014 |
| CN | 104318204 A | 12/2014 |
| CN | 203982399 U | 12/2014 |
| CN | 104239869 A | 1/2015 |
| CN | 204480268 U | 7/2015 |
| CN | 204595873 U | 8/2015 |
| CN | 105094443 A | 11/2015 |
| CN | 105138171 A | 12/2015 |
| CN | 105184282 A | 12/2015 |
| CN | 105205464 A | 12/2015 |
| CN | 205003632 U | 1/2016 |
| CN | 107004130 A | 8/2017 |
| EP | 2074946 A1 | 7/2009 |
| EP | 3273329 A1 | 1/2018 |
| JP | 11-120324 A | 4/1999 |
| JP | 2003144420 A | 5/2003 |
| JP | 2014209379 A | 11/2014 |
| KR | 20030095726 A | 12/2003 |
| KR | 20110095565 A | 8/2011 |
| KR | 20150092964 A | 8/2015 |
| KR | 20150131944 A | 11/2015 |
| TW | 200905578 A | 2/2009 |
| TW | 201426563 A | 7/2014 |
| WO | 01/69520 A2 | 9/2001 |
| WO | 2011110821 A1 | 9/2011 |
| WO | 2016205832 A1 | 12/2016 |

OTHER PUBLICATIONS

International Search Report from PCT/CN2018/078360 dated May 31, 2018 (4 pages).
International Search Report and Written Opinion from International Application No. PCT/US2016/038445, dated Sep. 30, 2016 (16 pages).
International Search Report from PCT/CN2017/072575 dated Apr. 1, 2017 (4 pages).
International Search Report from PCT/CN2017/083117 dated Aug. 10, 2017 (4 pages).
International Search Report from PCT/CN2018/071400 dated Mar. 29, 2018 (5 pages).
Korean Office Action from related Korean Patent Application No. 10-2017-7023032 dated Jan. 12, 2018 (9 pages). (English translation currently unavailable).
Supplementary Partial European Search Report from related European Patent Application No. 17743741 dated Nov. 8, 2018 (13 pages).
Chinese Office Action from related Chinese Patent Application No. 201780000132.6 dated Dec. 15, 2017 (6 pages). (English translation currently unavailable).
Chinese Office Action from related Chinese Patent Application No. 201780000132.6 dated Apr. 11, 2018 (10 pages). (English translation currently unavailable).
International Search Report from PCT/CN2016/104354 dated Feb. 8, 2017 (5 pages).
Korean Office Action from related Korean Patent Application No. 10-2017-7022868 dated Jan. 12, 2018 (9 pages). (English translation currently unavailable).
Supplementary European Search Report from related European Patent Application No. 16861560 dated Nov. 22, 2017 (8 pages).
Korean Office Action from related Korean Patent Application No. 10-2017-7031287 dated Feb. 14, 2018 (7 pages). (English translation currently unavailable).
Supplementary European Search Report from related European Patent Application No. 16812652 dated Mar. 19, 2018 (7 pages).
Extended European Search Report dated Apr. 1, 2019 for EP Application No. 17743741.5 (13 pages).

(56) References Cited

OTHER PUBLICATIONS

Extended European Search Report dated Jun. 3, 2019 for EP Application No. 17809591.5 (8 pages).
Partial/Supplementary European Search Report dated May 20, 2019 for EP1875868.4 (14 Pages).
Partial/Supplemental European Search Report dated Jun. 5, 2019 for EP17850146.6 (14 pages).
Partial/Supplemental European Search Report dated Jun. 11, 2019.

* cited by examiner

MULTIFUNCTION FINGERPRINT SENSOR HAVING OPTICAL SENSING AGAINST FINGERPRINT SPOOFING

CROSS REFERENCE TO RELATED APPLICATIONS

This patent document claims the benefits and priority of U.S. Provisional Patent Application No. 62/249,832, filed on Nov. 2, 2015. The entire content of the before-mentioned patent application is incorporated by reference as part of the disclosure of this document.

TECHNICAL FIELD

This patent document generally relates to fingerprint recognition and its applications for securely accessing an electronic device, an information system, or a computer-controlled system.

BACKGROUND

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Security access to a device such as a mobile device or a system such as an electronic database and a computer-controlled system can be achieved in different ways such as use of user passwords. A password, however, may be easily to be spread or obtained and this nature of passwords can reduce the level of the security. Moreover, a user needs to remember a password to use electronic devices or systems, and, if the user forgets the password, the user needs to undertake certain password recovery procedures to get authenticated or otherwise regain the access to the device and such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

The examples of implementations described in this patent document provide fingerprint sensor designs that combine two sensing functions for fingerprint sensing: (1) capturing fingerprint patterns for fingerprint identification by using a designated fingerprint sensor and (2) sensing whether an input object with fingerprint patterns is a finger from a living person by using a designated optical anti-spoofing sensor. The designated fingerprint sensor can be implemented based on various fingerprint sensing techniques. For example, the designated fingerprint sensor can be implemented as an optical fingerprint sensor to include one or more optical sensors for sensing fingerprints. For another example, the designated fingerprint sensor can be other types of fingerprint sensors such as capacitive sensors to sense fingerprints. The designated optical anti-spoofing sensor is used to collaborate with the designated fingerprint sensor sensing to provide an additional sensing function: using optical probe light to interrogate an input object to optically sense whether the input object, which may have fingerprint patterns, is a finger from a living person by optically measuring one or more indicators that are different from fingerprint patterns. The described fingerprint sensor designs can be used in various devices, systems or applications, and the disclosed technology can be used for securing access to various electronic devices and systems, including portable or mobile computing devices such as laptops, tablets, smartphones, and gaming devices, and larger systems such as automobiles and large information systems.

In one aspect, a method is provided for identifying a fingerprint from a finger of a live person during a fingerprint scan and includes using a fingerprint sensor to detect a contact input associated with a source of a fingerprint; generating an image signal from the fingerprint sensor responsive to the detected contact input, wherein the generated image signal from the capacitive fingerprint sensor is indicative of one or more images of the fingerprint; using an optical biometric sensor that is separate from the fingerprint sensor to generate a biometric marker detection signal indicative of a biometric marker different from the fingerprint; and processing, by processing circuitry, the generated image signal and the biometric marker detection signal to determine whether the detected contact and the associated one or more fingerprint images are from a finger of a live person who makes the contact input.

In another aspect, an electronic device is provided to include a device processor that performs functions of the electronic device; a touch panel in communication with the device processor as an user interface to operate the electronic device; a fingerprint sensor in communication with the device processor and operable to detect a contact input associated with a fingerprint and generate a signal indicative of an image of the fingerprint; and an optical biometric sensor that includes (1) a light source configured to emit probe light toward a location of the contact input and to generate signal light carrying information associated with the contact input including ridges and valleys of a finger when the finger is the contact input, and (2) an optical sensor located to receive the signal light from the location of the contact input and to convert the received signal light into the signal indicative of an identification of a biometric marker different from the fingerprint. The device further includes fingerprint processing circuitry communicatively coupled to the sensing circuitry to process the generated sensor signal to determine whether the contact input associated with the fingerprint belongs to a finger of a live person. The device processor is configured to permit or deny an access to the touch panel to operate the electronic device based on a determination of the processing circuitry from the both the image of the fingerprint and whether the fingerprint belongs to a finger of a live person who is authorized to access the electronic device.

In another aspect, a fingerprint sensor device is provided to include a touch panel with an integrated touch sensor module, the integrated touch sensor module including: sensing circuitry to generate a sensor signal responsive to detecting a contact input associated with a fingerprint, the sensing circuitry including a capacitive fingerprint sensor to detect the contact input and generate a signal indicative of an image of the fingerprint as part of the sensor signal, and an optical biometric sensor to generate a signal indicative of a biometric marker different from the fingerprint as part of the sensor signal; and processing circuitry communicatively coupled to the sensing circuitry to process the generated sensor signal to determine whether the contact input associated with the fingerprint belongs to a finger of a live person.

In another aspect, an electronic device is provided to include a device processor that performs functions of the electronic device; a touch panel in communication with the device processor; and a fingerprint sensor device integrated into the touch panel and in communication with the device processor, wherein the fingerprint sensor device includes a sensing circuitry to generate a sensor signal responsive to detecting a contact input associated with a fingerprint, the sensing circuitry including a capacitive fingerprint sensor engaged to the touch panel to detect the contact input and generate a signal indicative of an image of the fingerprint, and an optical biometric sensor that includes (1) a light source configured to emit probe light toward the touch panel at a location of the contact input and to generate signal light carrying information associated with the contact input including ridges and valleys of a finger when the finger is the contact input, and (2) an optical sensor located to receive the signal light from the touch panel at the location of the contact input and to convert the received signal light into the signal indicative of an identification of a biometric marker different from the fingerprint; and processing circuitry communicatively coupled to the sensing circuitry to process the generated sensor signal to determine whether the contact input associated with the fingerprint belongs to a finger of a live person. The device processor is configured to permit or deny an access to the electronic device based on a determination of the processing circuitry from the both the image of the fingerprint and whether the fingerprint belongs to a finger of a live person who is authorized to access the electronic device.

In yet another aspect, a method is provided for identifying a fingerprint from a finger of a live person during a fingerprint scan and includes using a capacitive fingerprint sensor to detect a contact input associated with a source of a fingerprint; generating an image signal from the capacitive fingerprint sensor responsive to the detected contact input, wherein the generated image signal from the capacitive fingerprint sensor is indicative of one or more images of the fingerprint; using an optical biometric sensor that is separate from the capacitive fingerprint sensor to generate a biometric marker detection signal indicative of a biometric marker different from the fingerprint; processing, by processing circuitry, the generated image signal and the biometric marker detection signal to determine whether the detected contact and the associated one or more fingerprint images are from a finger of a live person who makes the contact input.

Those and other aspects and their implementations are described in greater detail in the drawings, description and claims.

DETAILED DESCRIPTION

Figure 1A:
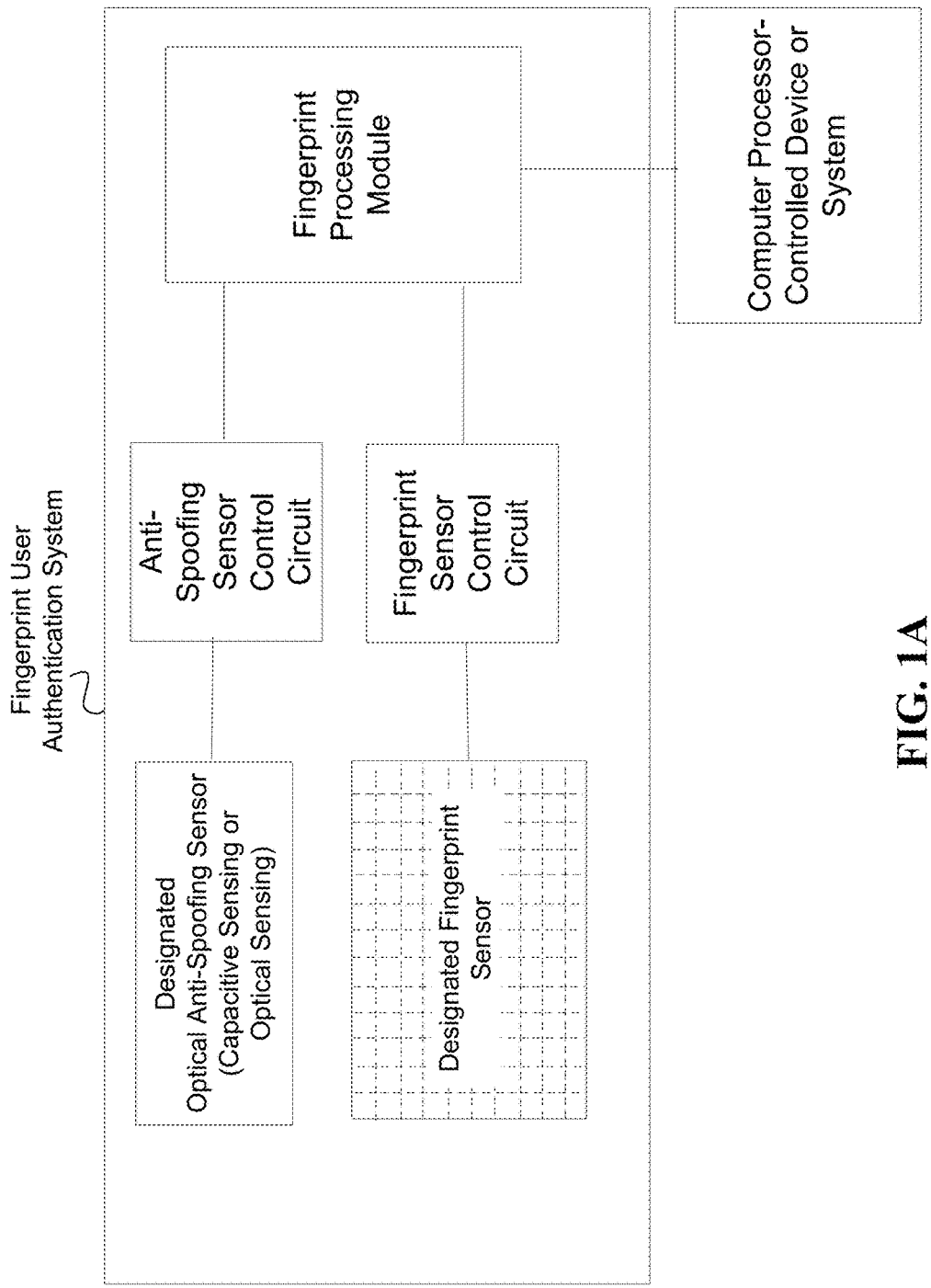
FIG. 1A is a block diagram of an example of a fingerprint user authentication system that controls the access to a computer processor controlled device or system by using (1) (1) a designated fingerprint sensor for capturing fingerprint patterns for fingerprint identification and (2) a designated optical anti-spoofing sensor for sensing whether an input object with fingerprint patterns is a finger from a living person and for determining whether a fingerprint input is a fingerprint spoofing attack.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

However, the secured or authorized access to such devices or systems may be compromised by defeating the fingerprint authentication mechanisms in various ways. For example, a fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device. Hence, a fingerprint pattern, although a unique biometric identifier, may not be by itself a completely reliable or secure identification. The techniques, devices and systems described in this document improve upon the fingerprint authentication technology used in existing electronic devices to potentially prevent a stolen fingerprint from being used to gain access to the targeted device. Specifically, the disclosed technology combines (1) a designated fingerprint sensor for capturing fingerprint patterns for fingerprint identification and (2) a designated optical anti-spoofing sensor for sensing whether an input object with fingerprint patterns is a finger from a living person and for determining whether a fingerprint input is a fingerprint spoofing attack. The designated fingerprint sensor and designated optical anti-spoofing sensor can be integrated in various ways as illustrated by some examples below.

In applications with fingerprint sensing security features, it is desirable to include robust and reliable fingerprint sensor features for identifying proper authorized users at high-speeds. In various applications such as consumer mobile devices, slow fingerprint identification can directly affect a user's interest or confidence in the otherwise high-quality devices and thus the performance of the fingerprint sensing in such devices is of particularly important. The designated optical anti-spoofing sensor designs disclosed herein can be implemented, in some implementations, to determine not only whether an input object with a fingerprint pattern is from a living person but also whether the living person uses a fabricated fake fingerprint layer on the person's finger in an attempt to invade the fingerprint sensing security of the system. Therefore, the designated optical anti-spoofing sensor designs improve the user security based on fingerprint sensing. In addition, the optical sensing mechanism used for the designated optical anti-spoofing sensor designs can provide high-speed responses without compromising the overall response speed of the fingerprint sensing operation.

The technology described in this patent document uses capacitive type fingerprint sensors for the designated fingerprint sensor in some implementations, and uses optical type fingerprint sensors for the designated fingerprint sensor in other implementations. In capacitive fingerprint sensors, the sensing of a fingerprint is based on measuring the capacitance between a sensing electrode and a finger surface due to their capacitive coupling in each sensing pixel of an array of sensing pixels. As the protective cover over the capacitive sensor pixels becomes thicker, the electrical field sensed by each capacitive sensor pixel disperses quickly in space leading to a steep reduction in the spatial resolution of the sensor. In connection with this reduction of the sensing spatial resolution, the sensor signal strength received at each sensor pixel also reduces significantly with the increase in thickness of the protective cover. Thus, when the protective cover thickness exceeds a certain threshold (e.g., 300 µm), it can become more difficult for such capacitive sensors to provide a desired high spatial resolution in sensing fingerprint patterns and to reliably resolve a sensed fingerprint pattern with an acceptable fidelity. Alternatively, a fingerprint sensor can also be implemented by using an optical fingerprint sensor. In some applications such as mobile devices or devices with limited thickness for the optical fingerprint sensors, the thickness of the optical fingerprint module must meet the thickness limitation. Examples of optical fingerprint sensors disclosed herein can be configured to be sufficiently thin to meet such requirements.

In one aspect, the disclosed technology provides a fingerprint sensor design for an optical fingerprint sensor for integration into an electronic device such as a mobile device and a designated optical anti-spoofing sensor to perform a separate anti-spoofing sensing function. In one aspect, the disclosed technology provides a fingerprint sensor design that uses a capacitive fingerprint sensor for fingerprint sensing in an electronic device and a designated optical anti-spoofing sensor to provide a separate anti-spoofing sensing function. In yet another aspect of the disclosed technology, a hybrid fingerprint sensor based on a capacitive fingering sensor and a designated optical anti-spoofing sensor is provided to include both an optical anti-spoofing pixel sensor and a capacitive fingerprint sensor in each sensing pixel of a pixelated sensor array. In implementations, optical sensors can be packaged as CMOS sensor arrays or photodiode arrays on edges of the display for either or both the designated optical anti-spoofing sensor and the designated optical fingerprint sensor. A window or a partially transparent coating can be used in the detectors. Examples of implementations of the disclosed technology can be used to introduce an optical technology for sensing finger properties including fingerprint detection and determination of whether a fingerprint input is a fingerprint spoofing attack. The optical technology can be used in a range of different devices or systems that have a display structure. The optical technology can be packaged in a discrete device.

Fingerprint Sensor Circuitry and Live Finger Detection

FIG. 1A shows an example of a fingerprint user authentication system that controls the access to a computer processor controlled device or system. This system includes a designated fingerprint sensor that includes an array of fingerprint sensing pixels for capturing fingerprint patterns for fingerprint identification. A fingerprint sensor control circuit is coupled to the designated fingerprint sensor to receive the output signals from the fingerprint sensing pixels and further process the output signals (e.g., filtering or amplifying the signals) to convert them into digital signals. The system also includes a designated optical anti-spoofing sensor that projects probe light to an input object and detects the reflected light from the input object for sensing whether the input object with fingerprint patterns is a finger from a living person and for determining whether a fingerprint input is a fingerprint spoofing attack. An anti-spoofing sensor control circuit is coupled to the designated optical anti-spoofing sensor to receive the one or more output signals from the designated optical anti-spoofing sensor and further process the one or more output signals (e.g., filtering or amplifying) to convert them into digital signals. A fingerprint processing module is coupled to the two sensor control circuits to receive their respective digital signals and process the received signals to determine whether the requested access be granted or denied. The fingerprint processing module may include one or more processors for processing fingerprint patterns and determining whether an input fingerprint pattern is one for an authorized user. The fingerprint processing module may compare a captured fingerprint to a stored fingerprint to enable or disable functionality in a device or system that is secured by the fingerprint user authentication system. In various devices such as mobile phones and tablets where a touch panel is provided to be in communication with the device processor as an user interface to operate the electronic device, the fingerprint processing module operates to grant or deny access to the touch panel of the device.

In addition to the fingerprint pattern, the fingerprint processing module processes information from the designated optical anti-spoofing sensor to determine whether the input object with a fingerprint pattern is a finger from a living person by quickly determining whether there is a blood flow in the input object. The fingerprint processing module may also process information from the designated optical anti-spoofing sensor over a period of time to extract a heartbeat or certain movements of the input object to further determine whether the input object is a finger of a living person. This provides an additional security level for the system. The fingerprint processing module can process information from the designated optical anti-spoofing sensor to determine whether a fingerprint input is a fingerprint spoofing attack by using a fabricate layer of a material placed over a person's finger. Furthermore, the fingerprint processing module can analyze certain dynamics or characteristics in the fingerprint images from the designated fingerprint sensor over a time period to determine whether the input object is a finger of a living person. Those features can enhance the security level for the system. For example, the fingerprint user authentication system at an ATM may determine the fingerprint of a customer requesting to access funds. Based on a comparison of the customer's fingerprint to one or more stored fingerprints, the fingerprint user authentication system may cause the ATM system to allow access to funds and may identify the customer in order to associate an appropriate account to credit or deduct the requested funds.

In some implementations, the designated fingerprint sensor uses a capacitive fingerprint sensor with an array of capacitive sensing pixels to capture the capacitances of different parts of a fingerprint that represent an image of the capture fingerprint. In other implementations, the designated fingerprint sensor uses an array of optical detectors to capture an optical image of received light that carries the fingerprint pattern from a finger that is touched on the optical fingerprint sensor sensing surface that is illuminated by an illumination light beam. In further implementations, fingerprint sensors based on other fingerprint capturing technologies may be used for the designated fingerprint sensor beyond the capacitive or optical sensing, such as pressure-based sensing, ultrasound sensing, thermal sensing, etc. No matter how the designated fingerprint sensor is implemented, its fingerprint sensing is further enhanced by using the designated optical anti-spoofing sensor.

Figure 1B:
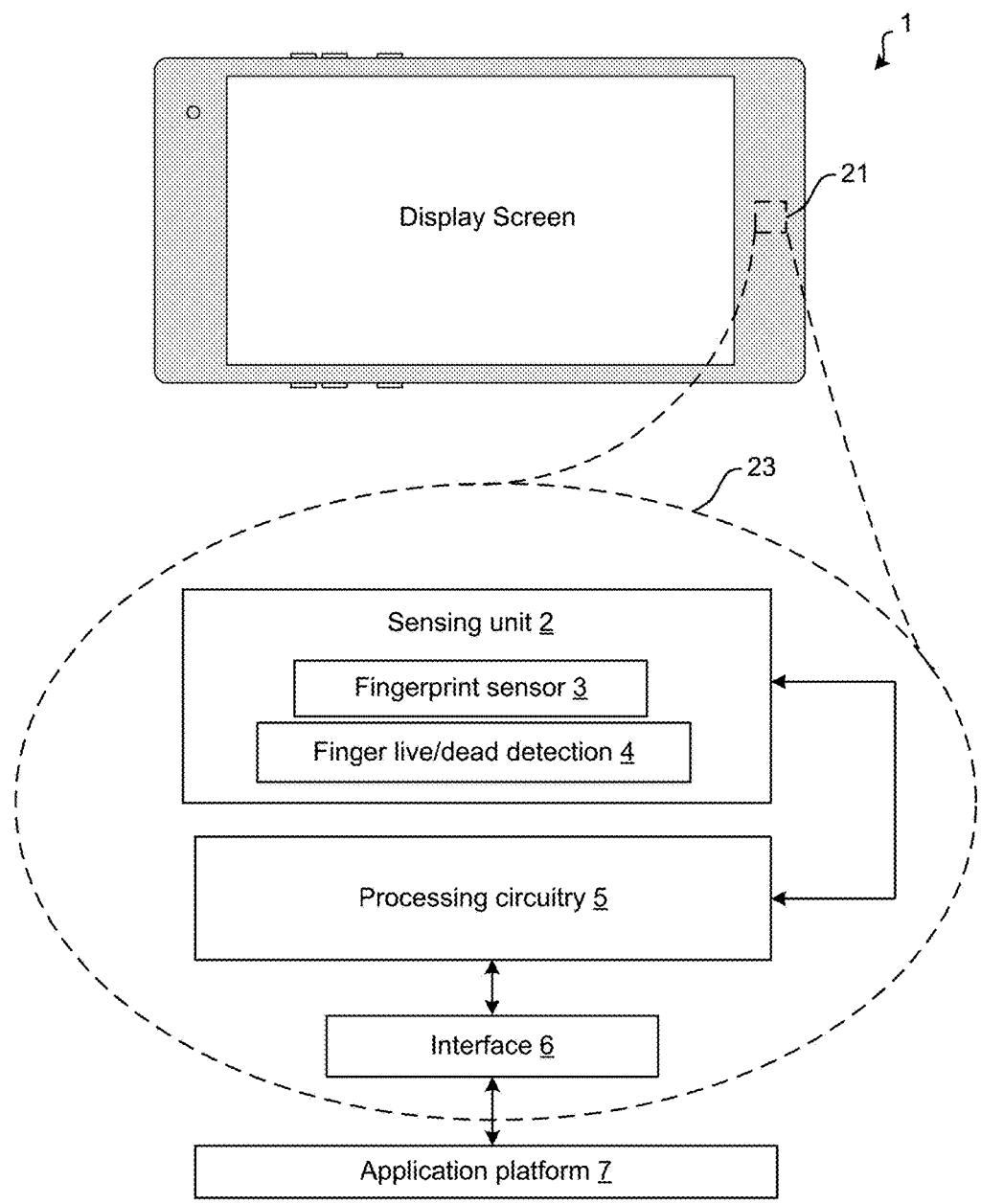
FIG. 1B is a block diagram showing an exemplary fingerprint sensor device implementing in a smartphone.

A wide range of devices or systems may be used in connection with the disclosed fingerprint sensors with the designated optical anti-spoofing sensor, including mobile applications, and various wearable or portable devices (e.g., smartphones, tablet computers, wrist-worn devices), larger electronic devices or systems, e.g., personal computers in portable forms or desktop forms, ATMs, various terminals or access devices to various electronic systems, databases, or information systems for commercial or governmental uses, motorized transportation systems including automobiles, boats, trains, aircraft and others. FIG. 1B illustrates an example for a smartphone or a portable device where the fingerprint user authentication system in FIG. 1A is a module that is integrated to the smart phone.

In FIG. 1B, a fingerprint sensor device 23 is implemented in a mobile device such as a smartphone 1. A fingerprint sensor device marker 21 is shown to indicate an exemplary position of the fingerprint sensor device 23 with respect to the mobile device 1. In this example, the fingerprint sensor device 23 is located outside the display screen. The fingerprint sensor device 23 includes a sensing unit or circuitry 2 that performs fingerprint scanning and obtains a signal indicating whether a received fingerprint is from a live person's finger. The sensing unit 2 is communicatively coupled to processing circuitry 5 that includes the fingerprint processing module in FIG. 1A to handle signal flow from the sensing unit 2 and to process the signal associated with fingerprint scanning and live/dead fingerprint judgment, etc. An interface 6 bridges signal flow between the fingerprint sensor device 23 and an application platform or a host device 7, which can include the smartphone 1. Examples of the application platform 7 include the smart phone 1, a tablet computer, a laptop computer, a wearable device, and other electronic device or system where a secure access is desired. For example, the interface 6 can communicate with a device or central processor (either directly or through other components, such as a bus or an interface) of the smartphone 1 to provide sensor data from the fingerprint sensor device 21 including fingerprint image data and information indicative of whether the detected fingerprint making the contact input belongs to a live finger. This aspect of the fingerprint sensor device 23 for indicating whether a received fingerprint is from a live person's finger can improve the security of the protected device because a fingerprint pattern of a user may be compromised in various ways, e.g., a person's fingerprint pattern may be reproduced by an intruder on an object's surface which can be in turn used to gain access to a device that only relies on the identification of a fingerprint pattern for access. The fingerprint sensor device 23 implements optical sensing of certain parameters for indicating whether a received fingerprint is from a live person's finger because, when a finger of a live person touches the fingerprint sensor, the received signal at the sensor carries with it certain signal characteristics that are associated with a live person and are not present from a non-living object, e.g., signal characteristics associated with the blood flows or heartbeat of the live person.

The sensing unit 2 performs both fingerprint scanning and live-finger detection. The sensing unit 2 includes a fingerprint sensor 3 that corresponds to the designated fingerprint sensor in FIG. 1A and a live finger sensor 4. The fingerprint sensor 3 can be implemented using one or a combination of available sensing techniques including self-capacitive sensing, mutual-capacitive sensing, optical sensing, or other sensing techniques. The live finger sensor 4 can include circuitry for analyzing fingerprint image dynamics to extract signal characteristics associated with a live person. For example, the fingerprint capacitive or optical images obtained from the fingerprint sensor 3 may carry the finger movement information, so that the image details, such as signal amplitude, and bright points coordinates, can be used to determine whether the finger touching the sensor device is from a live person. In some implementations, the live finger sensor 4 can include circuitry, such as optical sensors as the optical anti-spoofing sensor in FIG. 1A, for sensing additional biometric markers, such as characteristic optical absorption of blood or the heartbeat or heart rate from the scanned fingerprint.

The live finger sensor 4 performs the live finger detection or judgment based on the fact that a living finger is moving, stretching, or pulsing when the blood flows through the user's body. The live finger sensor 4 can include a pressure sensor, an optical sensor, or other sensors that can detect the moving, stretching, or pulsing of a live finger. For example, an optical sensor can include a light source, such as a light emitting diode (LED) or a laser diode (LD) to emit light and a light detector, such as a CMOS sensor or a photodiode, to detect scattered light scattered from the finger responsive to the emitted light. When the light propagates through the finger tissues or the blood cells, the light is partially absorbed and partially scattered. The live finger movement or the blood flow causes a change in the light absorption cross-section. The optical sensor detects this kind of change and the detected signal can be used to indicate whether a fingerprint that is being presented to the device is from a live person.

One method to determine whether the finger is that of a live person is to analyze the fingerprint image dynamics. In some implementations, the fingerprint images captured by a capacitive fingerprint sensor or optical fingerprint sensor carry the finger movement information associated with a live person, so that the image details, such as signal amplitude, and bright points coordinates, can be used to determine whether the finger touching the sensor device is alive.

In some implementations, the finger materials are analyzed based on optical sensing. For example, probe light of one or more wavelengths can be applied to illuminate the finger, and the light scattered from the finger represents the finger material information, including the blood cells, the heartbeat, the blood flow induced speckle patterns and Doppler frequency change, etc. The light scattered from the finger can be analyzed to extract certain characteristics associated with a live person and this analysis can be used to identify whether a live person is presenting the input.

In some implementations, an attempt to authenticate a fake fingerprint (e.g. printed in a translucent or transparent substrate, which may be overlaid over a live finger) can be detected and rejected. For example, two methods may be used to reject such a fingerprint spoofing by using a fake fingerprint pattern placed over a live finger.

The first method for indicating whether a received fingerprint is from a live person's finger is to integrate an optical sensor (e.g., CMOS or photo diode sensor elements) within the fingerprint sensing elements so that a hacker can't fool the finger liveness detection. This integration of optical sensing into the fingerprint sensor chip can be implemented in various ways including a configuration in which some of the pixel sensors are capacitive sensing and at least one of the pixel sensors is an optical sensor. The capacitive sensor can be used to detect the image of the ridges and valleys of the fingerprint for fingerprint identification. The optical sensing can be used as an additional sensing mechanism to perform the live-finger test by detecting light scattered from the finger in response to one or more emitted lights at different wavelengths. For example, optical absorption characteristics by blood at different optical wavelengths can be used to as one indicator whether the finger is from a live person. For another example, the finger of a live person tends to always move around and so the light incident on the live-finger can cause corresponding reaction that cannot be easily duplicated by a fake finger material. Thus, the capacitive sensor image of the finger and the optical sensing of characteristics of a live person can be used in combination to authenticate an input with improved access security.

The second example method for indicating whether a received fingerprint is from a live person's finger is to measure the scattered light distribution from the input to identify whether the input object is a fake fingerprint object. This can be used when a translucent or transparent fake finger is worn over an impostor's finger in an attempt to trick the fingerprint sensor. Due to the thickness of the fake fingerprint the scattered light distribution from the fake fingerprint tends to have a different characteristic than a live-fingerprint without the added fake fingerprint layer. Thus, even though the light scattering distribution may be similar to a live-fingerprint (since the light passed through the transparent fake fingerprint), there will still be a detectable difference between the registered scattered light distribution and the scattered light distribution of the fake fingerprint worn over a live finger. For example, the interface formed between the top sensing surface of the fingerprint sensor and the fake fingerprint layer placed over a live finger is different from the interface between the top sensing surface and a live finger in direct contact with the top sensing surface. Moreover, multiple light sources may be used at different locations to provide the scattered light distribution scattered from different portions of the finger in order to obtain a more complete profile of the finger by using optical detectors at different locations.

In implementations, a sequence of fingerprint images captured by a capacitive fingerprint sensor or optical fingerprint sensor can be used to represent a fingerprint image profile and can be used to recover or capture changes in the signal amplitude and bright spots distribution with time. A fake finger manifests different dynamics from a live finger. In addition, a micro pressure sensor may be integrated into the device to capture live finger movement signals by capturing the pressure variation caused by pressing the finger to represent a fingerprint movement profile. A live individual user may possess a corresponding unique fingerprint image profile and a unique fingerprint movement profile. By using the fingerprint image profile, the fingerprint movement profile, and a combination of both profiles, the fingerprint sensor of the disclosed technology can distinguish a fake fingerprint and a fake fingerprint overlaid on an imposter's live finger.

Fingerprint Image Dynamics Sensing Integrated with Pressure Sensor

Figure 2A:
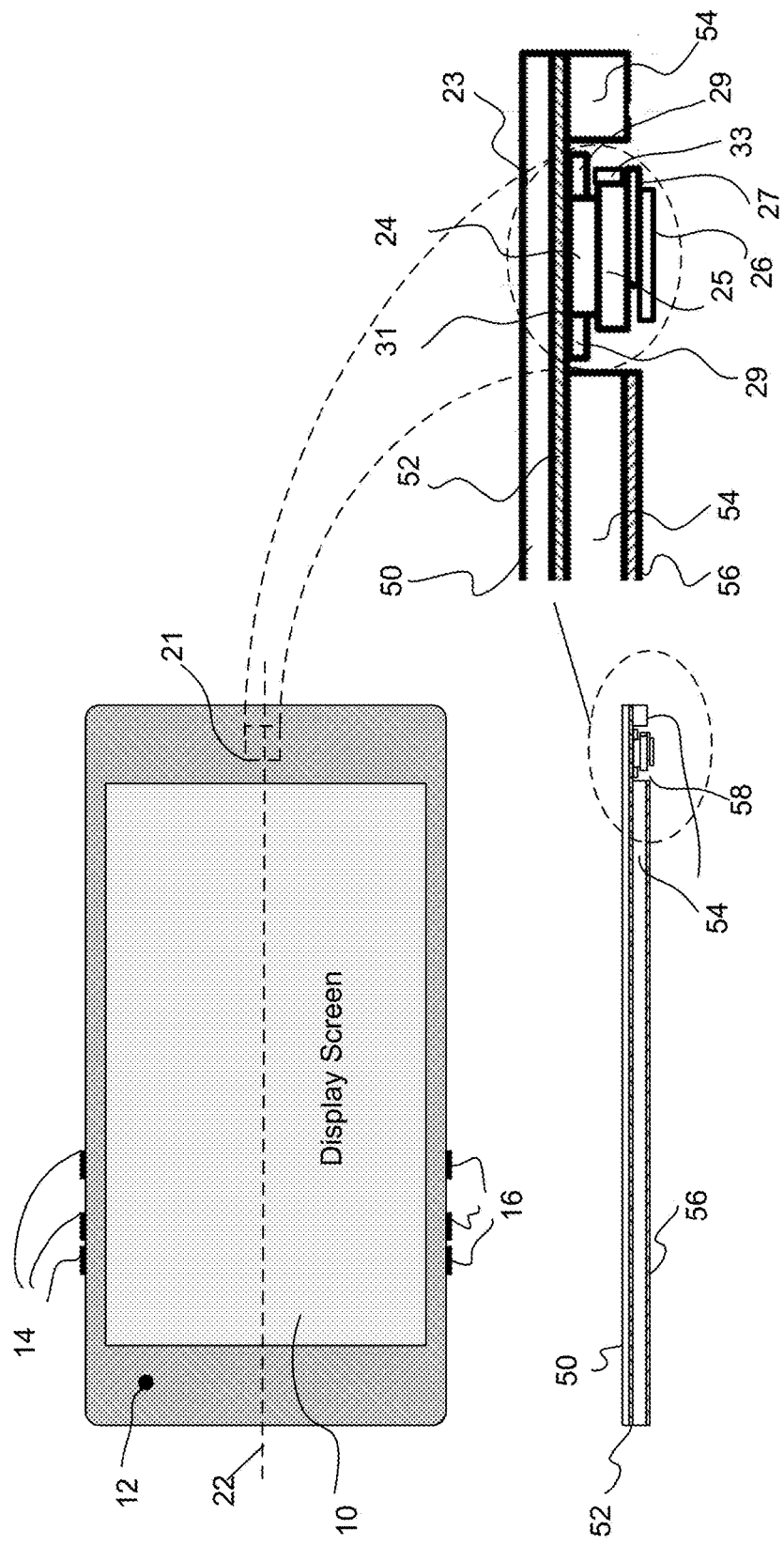
FIG. 2A is a block diagram of an exemplary fingerprint sensor device incorporated in a mobile device such as a smartphone device and including a pressure sensor and an optical anti-spoofing sensor in the fingerprint sensor device or module.
Figure 2B:
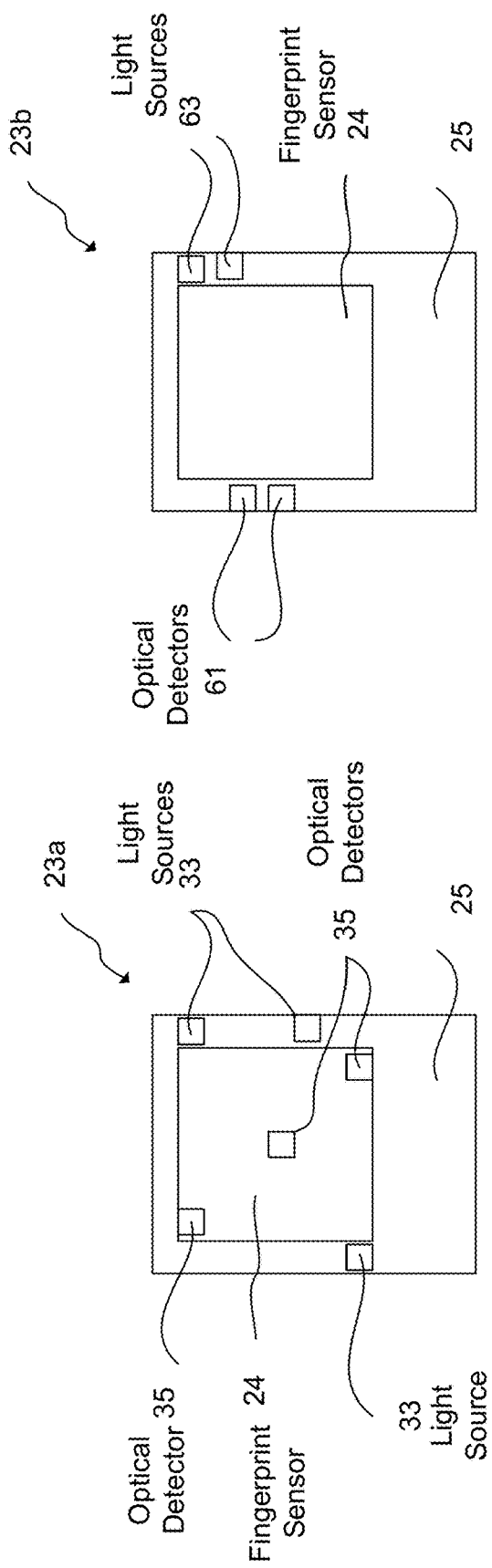
FIG. 2B shows top down views of two versions of the exemplary fingerprint sensor device in FIG. 2A.

FIG. 2A is a block diagram of an exemplary fingerprint sensor device 23 incorporated in a mobile device such as a smartphone device 1 in FIG. 1B and including a pressure sensor. The fingerprint sensor device marker 21 is shown to illustrate an exemplary position of the fingerprint sensor device 23 placed below the top glass cover 50 with respect to the smartphone device 1. At the bottom of FIG. 2A is a cross-sectional view of the smartphone platform 1 along a cut line 22 and the enlarged view of the fingerprint sensor device 23 integrated with an optical anti-spoofing detector. FIG. 2B shows top down views of two exemplary versions of the optical anti-spoofing detector arrangements for light sources and optical detectors in the fingerprint sensor device 23.

The smartphone device 1 includes a touch panel assembly 10 with a display screen and an integrated fingerprint sensor module or device 23 located at the location 21 adjacent to the display screen of the touch panel assembly 10. The smartphone device 1 includes other sensors 12 as well, such as a camera. The smartphone device 1 can also include various buttons 14 and 16, such as side buttons for receiving certain user inputs in operating the phone. The touch panel assembly 10 can include a top transparent cover 50, such as an enhanced cover glass, that is disposed over a support glass 54. A colored epoxy material layer 52 can be used to attach the cover glass 50 to the support glass 54. The support glass 54 can be used to support bottom layers 56 of the touch panel assembly 10 including the display screen. For example, the bottom layers 56 can include an optically transparent conductive layer, e.g., an ITO pattern, which may be printed on a bottom or back surface of the support glass 54. The support glass 54 can be structured to form a hole or otherwise sized or cut to provide a housing or indent 58 for placing the fingerprint sensor module or device 23 and the optical anti-spoofing detector. If the fingerprint sensor module or device 23 implements a capacitive fingerprint sensor of an array of capacitive sensing pixels, the top transparent cover 50 that covers the capacitive fingerprint sensor can be made sufficiently thin enable effective capacitive sensing.

The fingerprint sensor device or module 23 can include a fingerprint sensor chip 24 disposed on a back printed circuit board (PCB) 25 with integrated circuitry. The back PCB 25 can be disposed on a flexible printed circuit (FPC) 27. A micro pressure sensor 26 is disposed on the bottom side of the FPC 27 to measure the pressure and to capture a touch profile based on pressure measurements as part of the overall device anti-spoofing mechanism. An optional metal ring structure 29 can be disposed to surround the fingerprint sensor chip 23 and under the colored epoxy material layer 52. A thin epoxy material 31 can be used to glue the fingerprint sensor device 20 to the cover glass 50. One or more light sources 33, including discrete components, such as light-emitting diodes (LEDs) or laser diodes (LDs) can be disposed on or near the back PCB 25, and one or more photodetectors 35, such as photodiodes, can be disposed on the fingerprint sensor chip 24 as part of the optical anti-spoofing sensor for liveness detection.

In the optical fingerprint sensor design in FIG. 2B, the packaging design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. Under the illustrated design in FIG. 2B, the fingerprint sensor 23 formed in the area 21 for optical fingerprint is located under the top cover glass or layer 50 so that the top surface of the cover glass or layer 50 serves as the top surface of the device as a contiguous and uniform glass surface across both the display screen of the touch display assembly 10 and the optical detector sensor module 23. This design for integrating fingerprint sensing and the touch sensitive display screen under a common and uniform surface provides benefits, including improved device integration, enhanced device packaging, enhanced device resistance to failure and wear and tear, and enhanced user experience. In some implementations, such as the design in FIG. 2D, the fingerprint sensor module may be packaged in a discrete device configuration 99 that has a structural border or demarcation with the display screen, e.g., a button like fingerprint sensor structure in an opening of the top glass cover 50.

In operation, the fingerprint sensor chip 24 captures a fingerprint pattern of a finger in contact with the fingerprint sensing surface area labeled as 21 on the top glass cover above the fingerprint sensor chip 24 based on capacitive fingerprint sensing, optical fingerprint sensing or another suitable fingerprint sensing technique. The pressure sensor 26 conducts pressure measurements while the finger touches the fingerprint sensing surface area 21 and the one or more light sources 33 in the optical anti-spoofing sensor produces probe light to illuminate the finger for optical measurements for sensing whether the finger in contact is from a live person.

Optical Detection of a Live Finger

In FIG. 2B, two implementations 23a and 23b of the optical anti-spoofing sensing for the fingerprint sensor device or module are shown with various photodiode placements and light sources. The light sources for the optical anti-spoofing sensor can emit light at different wavelengths, e.g., a wavelength in the visible range and another wavelength in the IR range, for measuring different optical absorption levels of blood at the different optical wavelengths as part of the live finger detection by the optical anti-spoofing sensor.

In the example of the fingerprint sensor device or module 23a, the fingerprint sensor chip 24 is disposed on the back PCB 25 with integrated circuit. Discrete components, such as one or more light sources 33 (e.g., LEDs or LDs) are fixed on the back PCB 25 and outside the fingerprint sensor chip 24 to produce illumination probe light that illuminates the sensing surface area 21 where a finger touches to produce reflected probe light carrying information on the finger. The optical sensors 35 (e.g., CMOS sensors or photo diodes) are integrated as part of the fingerprint sensor chip 24 to receive and detect the reflected probe light from the sensing surface area 21 for performing the liveness detection. In the illustrated example, three optical sensors 35 are shown: one in the center of the fingerprint sensor chip 24 and two at two corners of the fingerprint sensor chip 24. Under this design, the number of the optical sensors 35 are limited so that the presence of the optical sensors 35 in the fingerprint sensing area of the fingerprint sensor chip 24 does not significantly impact the fingerprint sensing operation by the fingerprint sensor chip 24. In some implementations, the light sources 33 may also be integrated onto the fingerprint sensor chip 24.

In the fingerprint sensor device or module 23b, both optical sensors 61 (e.g., CMOS sensors or photo diodes) and the light sources 63 of the optical anti-spoofing sensor are installed external to the fingerprint sensor chip 24 and are, as a specific implementation example, placed on the back PCB 25. Other locations outside the sensor chip 24 may also be used for placing the optical sensors 61 and the light sources 63. The light sources 63 produces illumination probe light that illuminates the sensing surface area 21 where a finger touches to produce reflected probe light carrying information on the finger. The optical sensors 61 are located to receive and detect the reflected probe light from the sensing surface area 21 for performing the liveness detection.

Embodiments and examples of the disclosed technology can be used to implement two optical techniques for detecting a live finger. Specifically, the photo diodes and the light sources can be selectively integrated including: (1) integrating the optical sensors (e.g., photo diodes), the light sources, or both in the fingerprint sensor chip; and (2) integrating the optical sensors (e.g., photo diodes), the light sources, or both out of the fingerprint sensor chip.

In the first live finger detection technique, some of the photo diode elements are distributed out of the fingerprint sensitive elements area, and one or multiple optical sensing elements (e.g., photo diode elements) are distributed within the fingerprint sensitive elements area. In the design, some of the photo diode elements are distributed close to the light sources, and some of the photo diode elements are distributed relatively further from the light sources. This spatial arrangements of the light sources and optical sensors at different locations can be used to achieve different optical incident conditions of the probe light in the fingerprint sensing area 21 on the top cover glass 50 so that different optical reflection conditions are present to affect the properties of the reflected probe light at the interface of the fingerprint sensing area 21 for the liveness detection. The light sources can be LEDs, laser diodes (LDs), or other types of suitable light sources.

Figure 2C:
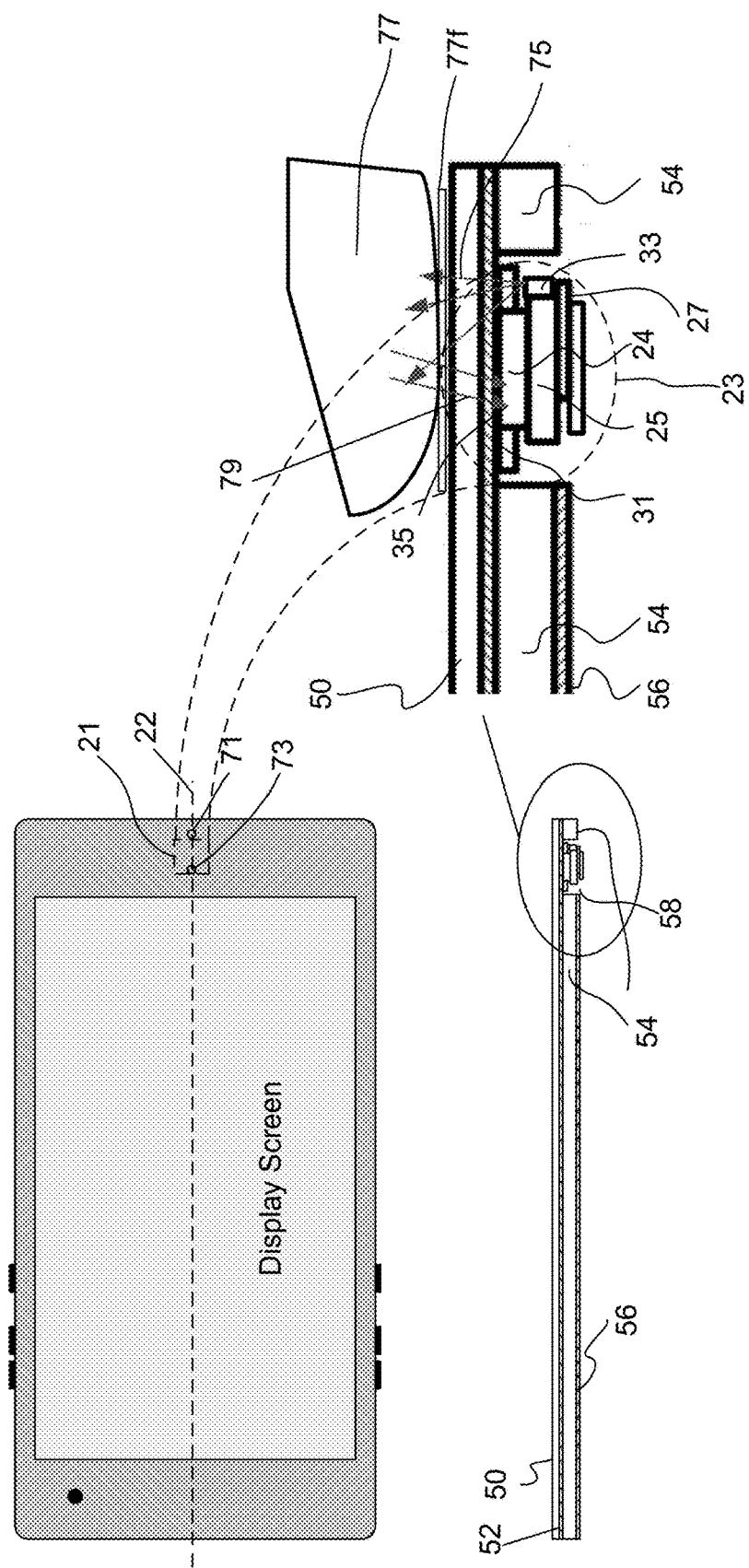
FIG. 2C is a diagram illustrating an exemplary operation of the optical anti-spoofing sensor in the fingerprint sensor device or module in FIG. 2A.

FIG. 2C illustrates an exemplary operation of the optical anti-spoofing sensor in the fingerprint sensor device or module 23. A light path window 71 is formed on or near the border of the fingerprint sensor mark 21 for transmitting the probe light 75 from the light sources 33 toward the fingerprint sensing area to illuminate a finger 77 placed thereon. Also, a light path window 73 is formed on or near a different border, e.g., the opposing border, of the fingerprint sensor mark 21 for receiving the reflected or scattered probe light 79 from the finger 77 by the photo sensors 35. Probe light beams 75 emitted by the light sources 33 (e.g., discrete components, such as LEDs, LDs) are directed toward the finger 77.

FIG. 2C further illustrates a fingerprint spoofing attack where a fake fingerprint pattern layer 77f is placed on the finger 77 in an attempt to invade the fingerprint security of the device. When the fake fingerprint pattern layer 77f used by a hacker is not optically transparent, the prove light 75 stops at the fake fingerprint pattern layer 77f and thus cannot reach the live finger of the hacker. Under this circumstance, the probe light scattered by the non-transparent fake fingerprint pattern layer 77f does not carry information associated with blood of the hacker, e.g., the optical absorption characteristics of blood at different optical wavelengths. This is because the non-transparent fake fingerprint material 77f interacts with the emitted light 75 different from a live finger material. Accordingly, the scattered probe light will be detected by the photo diode elements 35 as not being associated with a live finger.

It is possible for the hacker to place the non-transparent fake fingerprint 77f in the fingerprint sensing area and place a live finger at the photo diode elements area. In this case, the probe light scattered by the non-transparent fake fingerprint pattern layer 77f is mixed with scattered probe light caused by the live finger to carry information associated with blood of the hacker, e.g., the optical absorption characteristics of blood at different optical wavelengths. However, the photo diode elements 35 distributed within the fingerprint sensing area can determine the differences in the scattered probe light pattern between the non-transparent fake fingerprint 77f in direct contact with the fingerprint sensing area 21 and the direct contact by the live finger so as to trigger an access rejection. One of the differences, for example, is that the scattered probe light from the non-transparent fake fingerprint pattern layer 77f does not carry information associated with blood of the hacker, e.g., the optical absorption characteristics of blood at different optical wavelengths.

It is also possible for a hacker to use an optically transparent fake fingerprint pattern layer 77f in a fingerprint spoofing attack where the transparent fake fingerprint material forms a light path to allow the probe light to transmit through to reach the hacker's live finger and to return the scattered light back into the optical sensors 35. Under this situation, it is no longer sufficient to rely on the information associated with blood of the hacker, e.g., the optical absorption characteristics of blood at different optical wavelengths. However, the optical sensors 35 distributed within the fingerprint sensing area can determine the difference in the scattered probe light pattern between the case where the transparent fake fingerprint 77f is in direct contact with the fingerprint sensing area 21 and the case where the fingerprint sensing area 21 is in the direct contact with the live finger without the transparent fake fingerprint 77f so as to trigger an access rejection based on the different reflected light distribution patterns caused by different optical interfacing conditions between the situation where the non-transparent fake fingerprint pattern layer 77f is in direct contact with the fingerprint sensing area 21 and the situation where the live finger is in direct contact with the fingerprint sensing area 21. For example, the photo diode elements 35 distributed at different distances from the from the light sources 33, e.g., photo diodes being placed close to and far away from the light sources 33, can detect the difference in the scattered light distribution patterns due to the different direct contacts with the fingerprint sensing surface 21 caused by the direct contacting transparent fake fingerprint 77f and the direct contacting live finger. This difference can be used to trigger the access rejection when the direct contacting transparent fake fingerprint 77f is detected.

In addition, the fingerprint processing module may also process information from the designated optical anti-spoofing sensor over a period of time to extract a heartbeat or certain movements of an input object as a finger (e.g., blood flow information), or use certain dynamics in the captured fingerprint patterns by the designated fingerprint sensor over a period time in connection with a live person, or the movement information from a pressure sensor, to further determine whether the input object is a finger of a living person. All those and other security sensing features can be used in combination to provide an additional security level or different security levels for the system.

Figure 2D:
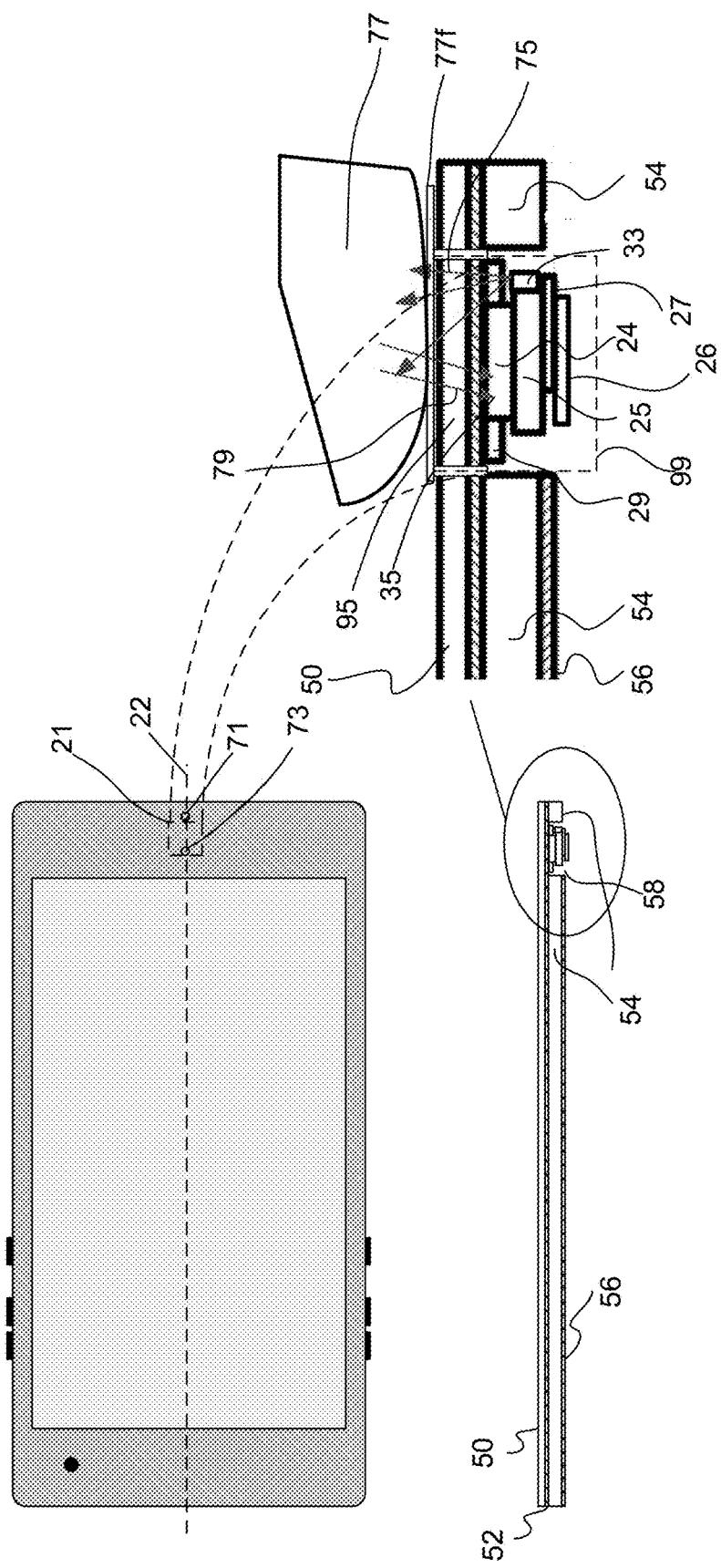
FIG. 2D is a diagram illustrating another exemplary operation of the fingerprint sensor device or module in FIG. 2A.

FIG. 2D shows another design of a fingerprint sensor module 99 that is packaged as a separate button to perform the fingerprint detection and live-finger detection. In this example, an opening or hole is formed in the top glass cover 50 to place the fingerprint sensor module 99 a separate structure that is exposed by the hole or opening of the top glass cover 50. In the fingerprint sensor module 99, a top glass cover piece 95 is provided in replacement of the a portion of the contiguous top glass cover 50 in FIG. 2A and is placed in the opening or hole of the top glass cover 50 so that the top surface of the top glass cover piece 95 is at or near the top surface of the surrounding top glass cover 50 to serve as the fingerprint sensing surface area 21. Under this design, the rigidity or the strength of the material for the cover glass 50 may be required at a higher level than the design in FIG. 2A where the fingerprint sensor module 23 is placed under a contiguous top glass cover 50.

The device configuration and operation of the separately packaged fingerprint sensor module 99 in FIG. 2D can be similar to the design in FIG. 2A. For example, the fingerprint sensor chip 24 can be based on capacitive fingerprint sensing, optical fingerprint sensing or another suitable fingerprint sensing technology. For another example, the layouts of the optical sensors and light sources shown in FIG. 2B can be applied to the design in FIG. 2D. The above described live finger detection and anti-spoofing operations for FIG. 2A can be equally applied to the design in FIG. 2D.

The disclosed fingerprint sensing techniques in this document can be used to provide different level of fingerprint sensing based security levels for accessing a device (e.g., a smartphone or a laptop) or a system (e.g., an ATM, an automobile or a secured online database). The match of an input fingerprint and an authorized fingerprint from an authorized user may be used to provide a baseline security level and additional information obtained in the fingerprint sensing process can be used to provide additional security verification for enhanced security levels before granting access to the device or system. For example, the information from the designated optical anti-spoofing sensor over a period of time to extract a heartbeat or certain movements of an input object as a finger (e.g., blood flow information), or certain dynamics in the captured fingerprint patterns by the designated fingerprint sensor over a period time in connection with a live person, or the movement information from a pressure sensor, can be used to provide enhanced user verification in addition to a fingerprint match.

Figure 3:
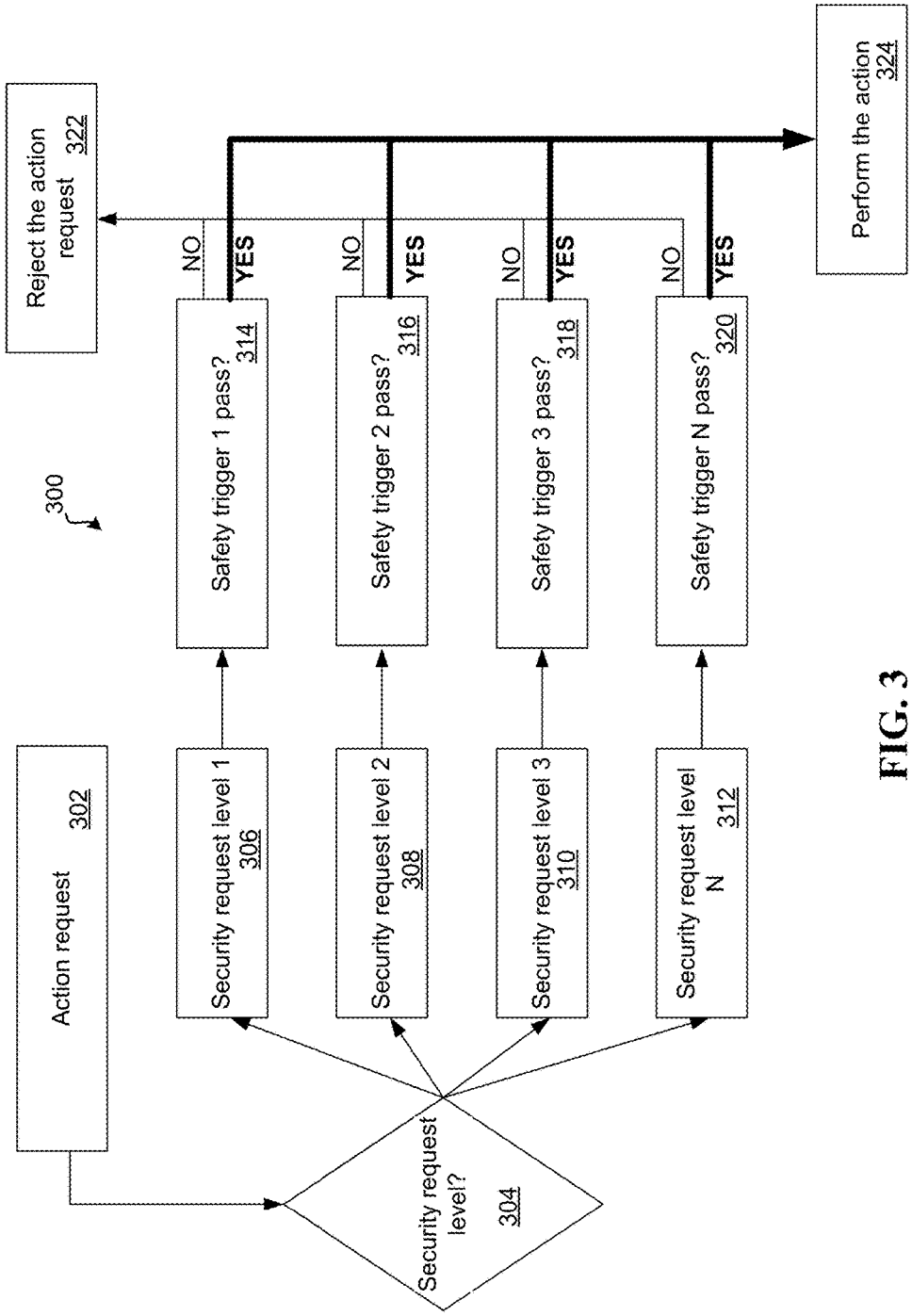
FIG. 3 shows a process flow diagram of an exemplary process for setting up different security levels for authenticating a live finger.

FIG. 3 shows a process flow diagram of an exemplary process 300 for setting up different security levels for authenticating a live finger. Different security level criterions may be set up based on the type of action requested. Using one or more basic functions of a device or system may require only the basic level verification (e.g., using an app on a mobile device or viewing some general information in a database system) while performing other functions may require enhanced security level clearance, such as accessing a contact database or other personal information on a mobile phone, making a financial transaction, or viewing sensitive information in a database system.

For example, a regular action request is required to pass security level 1 check. A request for a financial transaction for an amount below a threshold, such as under $100 payment needs to pass security level 2. A financial transaction for an amount over the threshold may require a higher security level clearance. Different security level action is triggered after different safety level evaluation. The safety levels corresponding to different security levels can be set up by combining different live-finger signatures. For example, single light source signals can be used to set up safety level 1 gate, two light source signals can be combined to set up a higher security safety level 2 gate, and so on.

The method 300 can begin when an action is requested (302). The requested action is analyzed to determine an appropriate security level (304). When determined that that security level 1 (the lowest security level) is required (306), the safety trigger level 1 is required to be passed (314). When the fingerprint analysis passes the safety trigger level 1, the requested action is performed (324). However, when the fingerprint analysis fails the safety trigger level 1, the requested action is denied (322).

Similarly, when determined that that security level 2 is required (308), the safety trigger level 1 is required to be passed (316). When the fingerprint analysis passes the added safety trigger level 2, the requested action is performed (324). However, when the fingerprint analysis fails the added safety trigger level 2, the requested action is denied (322).

When determined that that security level 3 is required (310), the safety trigger level 1 and level 2 is required to be passed (318). When the fingerprint analysis passes the added safety trigger level 3 beyond the level 2, the requested action is performed (324). However, when the fingerprint analysis fails the safety trigger level 3, the requested action is denied (322). Such different levels can be implemented to provide enhanced security in accessing the secured device or system based on the security needs.

The sensor circuitry according to the disclosed technology can detect a pattern of a palm similar to fingerprint detection when the user presses the palm skin onto the sensor.

Fingerprint Sensor Technologies

Fingerprint sensor modules as disclosed in this patent document can be implemented using one or a combination of various sensing technologies including self-capacitive sensing, mutual capacitive sensing, and optical sensing, among others. The disclosed technology for detecting a live finger can be implemented in various fingerprint pattern sensing technologies, and any one or a combination of the various sensing technologies can be incorporated with the disclosed optical sensing of whether a fingerprint is from a live person.

Figure 4A:
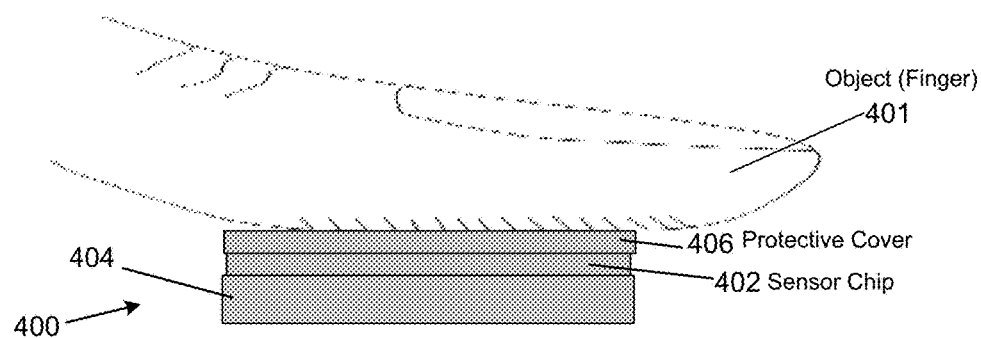
FIG. 4A is a block diagram of an exemplary fingerprint sensor device implementing self-capacitive sensing with active sensor pixel and amplification.

For example, FIG. 4A is a block diagram of an exemplary fingerprint sensor device 400 implementing self-capacitive sensing with active sensor pixel and amplification. The fingerprint sensor device 400 is one example for implementing the designated fingerprint sensor examples in of FIGS. 1A, 1B, 2A and 2D based on self-capacitive sensing. The self-capacitive fingerprint sensor device 400 includes a sensor chip 402 disposed over a substrate carrier 404 and a protective film or cover layer 406 disposed over the sensor chip 402. The protective film or cover layer 406 can include an insulator or dielectric material such as glass, silicon dioxide ($SiO_2$), sapphire, plastic, polymer, or other substantially similar materials. The protective film or cover layer 406 can be present to protect the sensor chip 402 and to function as a part of a dielectric layer between a surface of a finger 401 and conductive sensing electrodes of individual sensor pixels in the sensor chip 402. The protective film or cover layer 406 is an optional layer depending on the application of the fingerprint sensor device 400. In some implementations, the fingerprint sensor device 400 can be disposed through an opening of a top cover glass of an electronic device such as a mobile phone or under a top cover glass of the electronic device. When used in the under-the-glass application, the protective film or cover 406 is not needed because the top cover glass of the electronic device can function to protect the sensor chip 402 and act as the dielectric layer. The sensor chip 402 includes an array of sensor pixels that in combination senses or captures fingerprint data from the finger 401 in contact with the protective film or cover layer 406. Each sensor pixel of the sensor chip 402 generates an output signal (e.g., a voltage) based on a capacitance of a capacitor associated with a ridge or valley of the finger 401. The output signals when combined represent a fingerprint image of the finger 401. Higher the number of pixel sensors, greater the resolution of the fingerprint image.

Figure 4B:
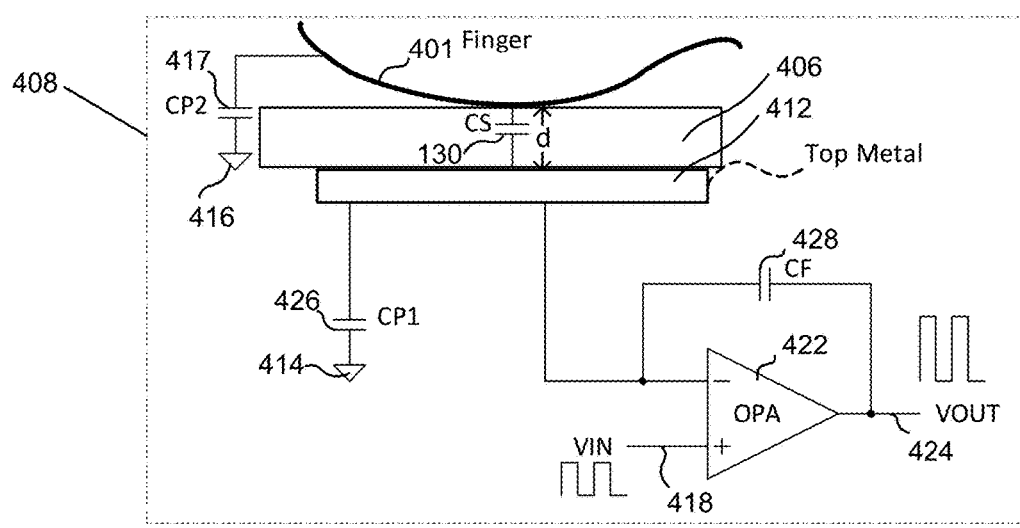
FIG. 4B shows an exemplary sensor pixel.

An exemplary sensor pixel 408 is shown in FIG. 4B. Each sensor pixel in the array of sensor pixels of the sensor chip 402 can be substantially similar to the exemplary sensor pixel 408. The exemplary sensor pixel 108 includes an operational amplifier 422 to amplify a capacitance related signal (e.g., voltage signal) detected by the exemplary sensor pixel 408. A sensor electrode 412 that includes a conductive material, such as one of a variety of metals is electrically connected to a negative or inverting terminal of the amplifier 422. The amplifier configuration shown and described with respect to FIG. 4B (and other figures of this patent document) is just one example and other amplifier configurations are possible including a positive feedback configuration.

Figure 4C:
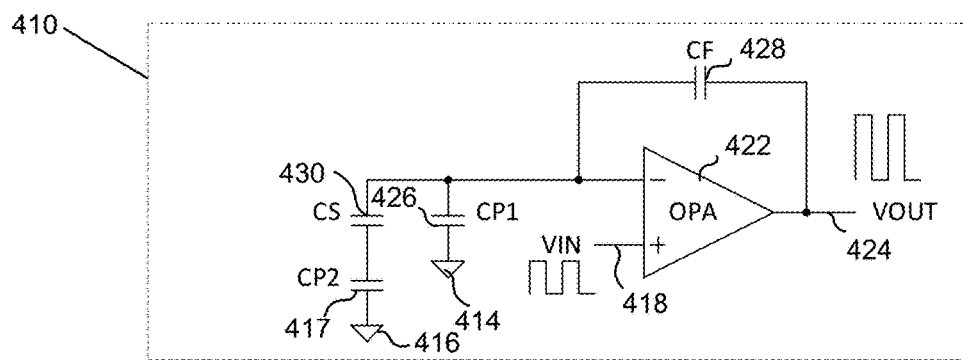
FIG. 4C shows a circuit representation of the exemplary sensor pixel.

FIG. 4C is the circuit equivalent of FIG. 4B. The sensor electrode 412 in each sensor pixel and a local surface of the finger 401 at that sensor pixel collectively function as opposing plates of a capacitor CS 430. The capacitance of the capacitor CS 430 varies based on a distance 'd' between the local surface of the finger 401 and the sensor electrode 412, the distance between the two plates of the capacitor CS 430. The capacitance is inversely proportional to the distance 'd' between the two plates of the capacitor CS 430. The capacitance is larger when the sensor electrode 412 is opposite a ridge of the finger 401 than when opposite a valley of the finger 401.

In addition, various parasitic capacitors can be formed between different conductive elements in the exemplary sensor pixel 408. For example, a parasitic capacitor CP1 426 can form between the sensor electrode 412 and a device ground terminal 414. Another parasitic capacitor CP2 417 can form between the local surface of the finger 401 and an earth ground 416. Device ground is coupled to earth ground closely. Yet another capacitor CF 128 can form between an output conductor of the amplifier 422 and the negative or inverting terminal of the amplifier 422 and functions as a feedback capacitor to the amplifier 422.

The positive terminal of the amplifier 422 is electrically connected to an excitation signal Vin 418. The excitation signal Vin 418 can be directly provided to the positive terminal of a dedicated amplifier in each sensor pixel. By providing the excitation signal Vin 418 directly to the positive terminal of the amplifier 422, the exemplary sensor pixel 408 becomes an active sensor pixel. In addition, providing the excitation signal Vin 418 directly to the positive terminal of the amplifier 422 eliminates the need to include an excitation electrode, common to all sensor pixels, which reduces a conductive (e.g., metal) layer from the semiconductor structure of the sensor chip 402. In addition, by providing the excitation signal Vin 418 directly to the amplifier 422, the excitation signal Vin 418 is not applied directly to the finger to avoid potentially irritating or injuring the finger 401. Moreover, because the excitation electrode for applying the excitation signal directly to the finger is not used, all components of the fingerprint sensor device 400 can be integrated into a single packaged device, and the entire fingerprint sensor device 400 can be disposed under the protective cover glass. With the entire fingerprint sensor device 400 disposed under the protective cover glass, the fingerprint sensor device 400 is protected from the finger and other external elements that may potentially damage the fingerprint sensor.

The amplifier 422 can generate an output signal based at least on the variable capacitance of the variable capacitor CS 430, and the output signal can contributes to the overall fingerprint data. The amplifier 422 can generate the output signal based at least on the variable capacitance and feedback capacitance of the feedback capacitor CF with no additional non-parasitic capacitances contributing to the output signal. This is partly because, as described above, an additional electrode such as an external drive electrode is not used in the sensor pixel 408.

Figure 5A:
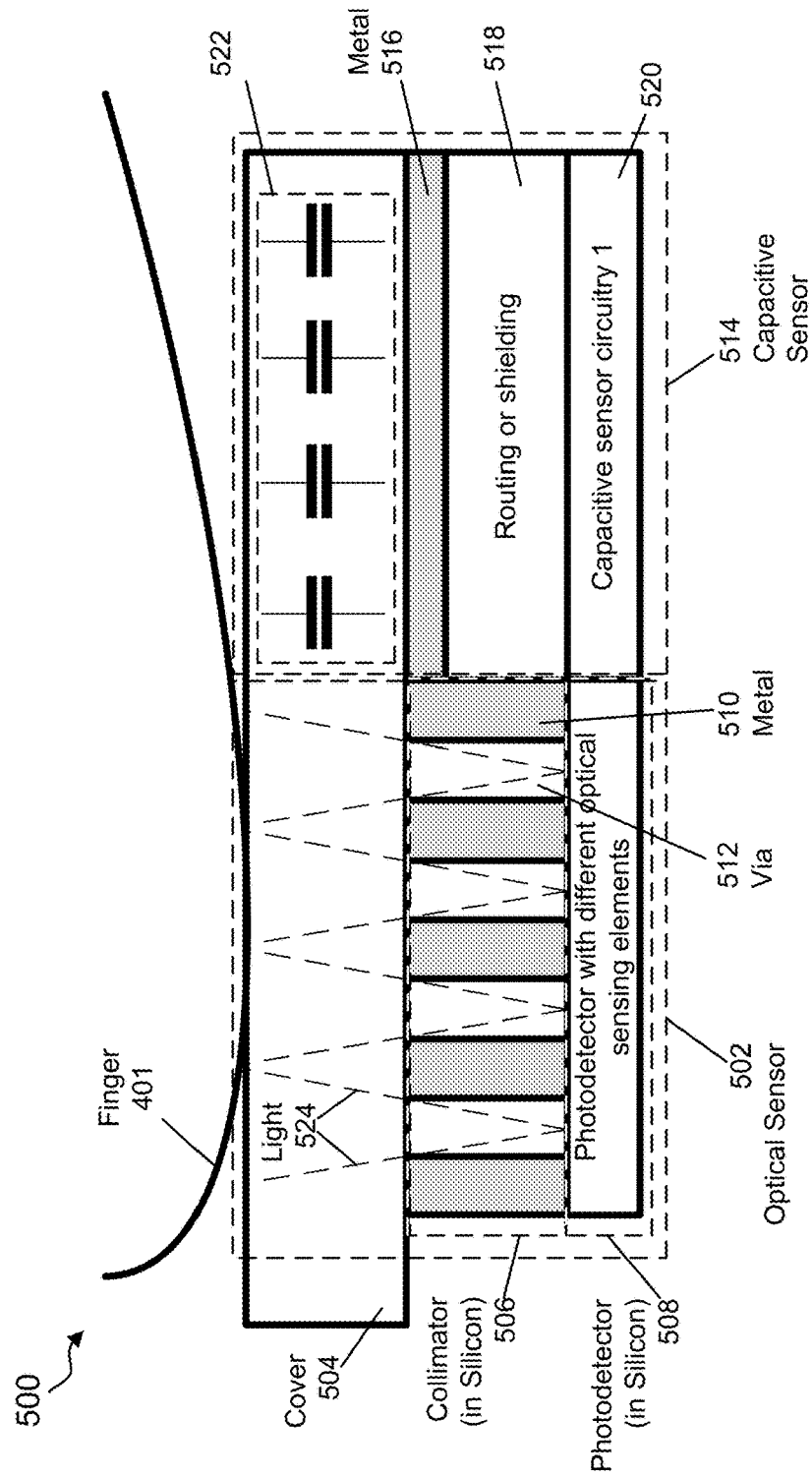
FIG. 5A shows an example of a fingerprint sensor device that incorporates a capacitive sensor in addition to an optical sensor for each sensor pixel in capturing fingerprint information.
Figure 5B:
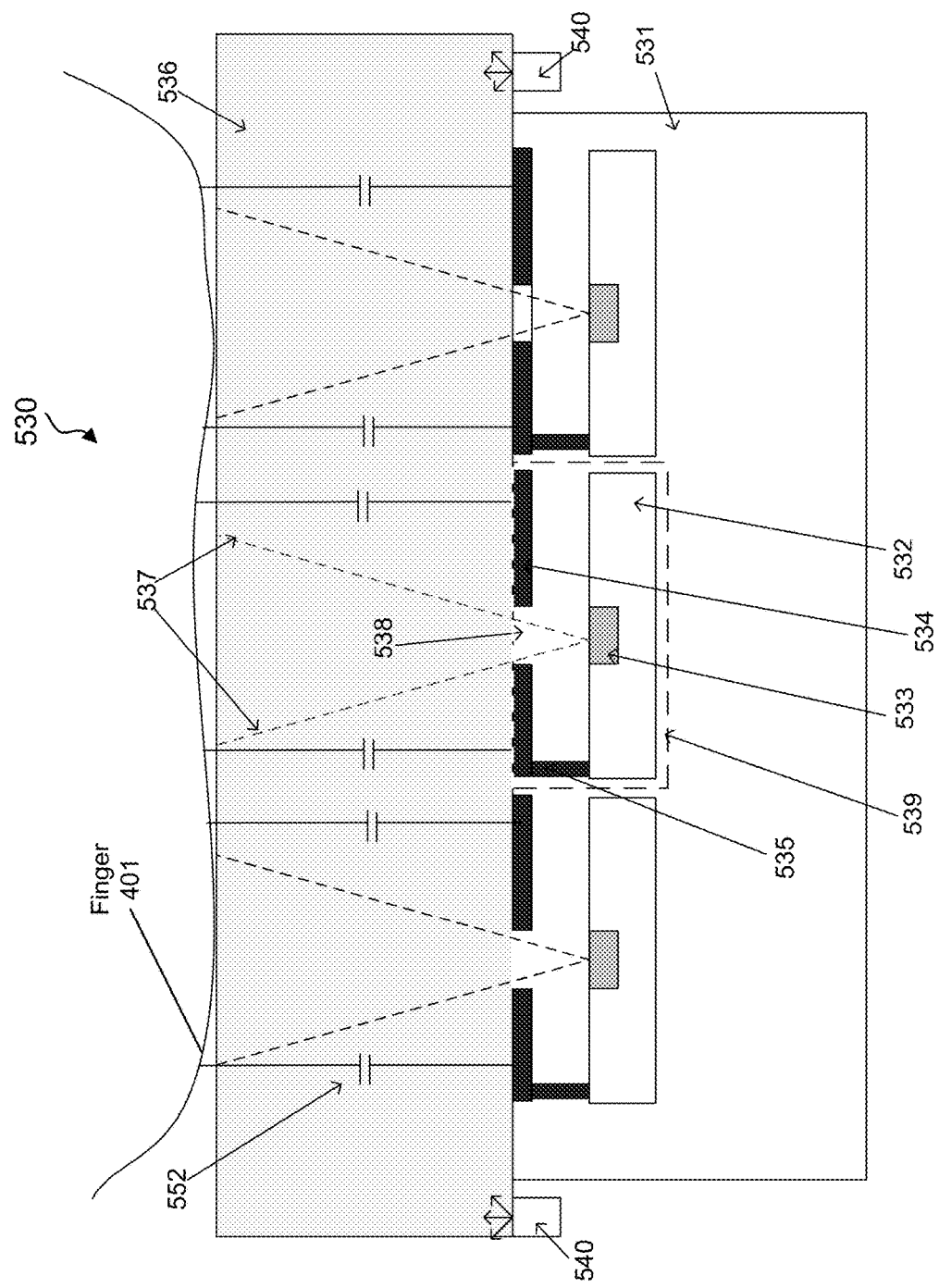
FIG. 5B illustrates another example of a fingerprint sensor device that structurally integrates an optical sensor and a capacitive sensor in each hybrid sensor pixel in a spatially overlap configuration in an array of sensor pixels to reduce the footprint of each hybrid sensing pixel.

Fingerprint Sensor Technologies: Optical Sensors Integrated within Capacitive Sensing Pixels In another aspect of the disclosed technology, each sensing pixel of a fingerprint sensor device can be a hybrid sensing pixel having a capacitive sensor for capturing fingerprint information and an optical sensor for capturing fingerprint information including live finger detection as disclosed in this patent document. FIGS. 5A and 5B show two examples of such hybrid sensing pixel designs. The optical sensors integrated with capacitive sensing pixels for capacitively sensing a fingerprint pattern can be collectively used as the designated optical anti-spoofing sensor. For example, such optical sensors can be used optically capture information on the finger over a period of time to extract a heartbeat or certain movements of an input object as a finger (e.g., blood flow information), or certain dynamics in the captured fingerprint patterns by the designated fingerprint sensor over a period time in connection with a live person, or the movement information from a pressure sensor, can be used to provide enhanced user verification in addition to a fingerprint match. Notably, such optical sensors integrated with capacitive sensing pixels for capacitively sensing a fingerprint pattern can also be used to capture an optical image of the same fingerprint as a second fingerprint sensor based on optical sensing.

FIG. 5A shows an example of a fingerprint sensor device 500 that incorporates a capacitive sensor in addition to an optical sensor for each sensor pixel in capturing fingerprint information. By combining both capacitive sensors and optical sensors, the live finger detection can be obtained at least in party by using the built-in optical sensors. In addition, fingerprint images obtained with the optical sensors can be used to better resolve the fingerprint structure obtained with the capacitive sensors. In this regard, the optical sensors in FIG. 5A forms a second fingerprint sensor with optical sensing pixels. This second fingerprint sensor with optical sensing pixels can be placed underneath the top glass over 50 and may construct each optical sensing pixel by an optical collimator element. Therefore, the optical sensing with the optical collimator feature in FIG. 5A may be implemented in a mobile device or an electronic device or system based on optical fingerprint sensing to include a display screen structure; a top transparent layer formed over the display screen structure as an interface for being touched by a user and for transmitting the light from the display screen structure to display images to a user; and an optical fingerprint sensor module located below the top transparent layer to receive light that is returned from the top transparent layer to detect a fingerprint. The optical sensor module includes an optical sensor array of photodetectors that receive the returned light and an array of optical collimators to collect the returned light from the top transparent layer and to separate light from different locations in the top transparent layer while directing the collected returned light through the optical collimators to the photodetectors of the optical sensor array.

For illustrative purposes, the structure shown in FIG. 5A represents one sensor pixel in an array of sensor pixels and each sensor pixel includes an optical sensor 502 and a capacitive sensor 514 that are disposed next to each other within the same sensor pixel.

The optical sensor 502 is one optical sensing pixel of a larger optical sensing pixel array and includes a photodetector 508 and a collimator 506 disposed over the photodetector 508 to narrow or focus reflected light 524 from finger 401 toward the photodetector 508. One or more light sources, such as LEDs (not shown), can be disposed around the collimator 506 to emit light, which is reflected off the finger 401 as reflected light 524 and is directed or focused toward the corresponding photodetector 508 to capture a part of the fingerprint image of the finger 401. The collimator 506 can be implemented using an optical fiber bundle of different fibers or one or more metal layer(s) with holes or openings. FIG. 5A shows the collimator 506 implemented using one or more metal layers 510 with holes or openings 512 as one collimator pixel of a larger collimator array.

In the capacitive sensing part of each sensing pixel, the capacitive sensor 514 includes a capacitive sensor plate 516 that is electromagnetically coupled to a portion of a finger that is either nearby or in contact with the sensing pixel to perform the capacitive sensing. More specifically, the capacitive sensor plate 516 and the finger 401 interact as two plates of one or more capacitive elements 522 when the finger 401 is in contact with or substantially near the optional cover 504 or a cover on a mobile device that implements the fingerprint sensor device 500. The number of capacitive sensor plates 516 can vary based on the design of the capacitive sensor 514. The capacitive sensor plate 516 can be implemented using one or more metal layers. The capacitive sensor plate 516 is communicatively coupled to capacitive sensor circuitry 520 so that the capacitive sensor circuitry 520 can process the signals from the capacitive sensor plate 516 to obtain data representing the 3D fingerprint structure. A routing or shielding material can be disposed between the capacitive sensor plate 516 and the capacitive sensor circuitry to electrically shield the metal plate 516. The capacitive sensor circuitry 520 can be communicatively coupled to both the capacitive sensor plate 516 and the photodetector 508 to process both the signal from the capacitive sensor plate 516 and the signal from the photodetector 508.

In FIG. 5A, the capacitive sensor 514 and the optical sensor 502 within each hybrid sensing pixel are adjacent to and displaced from each other without being spatially overlapped. FIG. 5B illustrates another example of a fingerprint sensor device 530 that structurally integrates an optical sensor and a capacitive sensor in each hybrid sensor pixel in a spatially overlap configuration in an array of sensor pixels to reduce the footprint of each hybrid sensing pixel. The fingerprint sensor device 530 includes a semiconductor substrate 531, such as silicon. Over the substrate 531, multiple sensing elements or sensing pixels 539 are disposed. Each sensing element or sensing pixel 539 includes active electronics circuitry area 532 including CMOS switches, amplifier, resistors and capacitors for processing sensor signals. Each sensing pixel or sensing element 539 includes a photodetector 533 disposed or embedded in the active electronics circuitry area 532. A capacitive sensor plate or a top electrode 534 of the capacitive sensor for capacitive sensing is disposed over a photodetector 533 and includes a hole or opening 538 on the sensor plate 534 to function also as a collimator of light for directing light onto the photodetector 533. A via 535 filled with conductive material is disposed to electrically connect the top electrode 534 to the active circuit elements 532. By adjusting the opening or the hole and the distance of the top electrode 534 with the photodetector 533, the light collecting angle 537 of the photodetector (e.g., photodiode) 533 can be adjusted. The fingerprint sensor device 530 is covered by a protective cover 536, which includes hard materials, such as sapphire, glass etc. Photodetector 533 light collection angle 537 can be designed to preserve the spatial resolution of the image collected by the photodiode arrays. A light source 540, such as an LED, is placed under the cover, on the side of fingerprint sensor device 530 to emit light, which is reflected off the finger and directed toward the photodetector 533 to capture the fingerprint image. When a finger 401 touches or comes substantially near the protective cover, the finger 401 and the sensing top electrode 534 in combination form a capacitive coupling (e.g., capacitor 542) between the human body and sensing top electrode 534. The fingerprint sensor device 530 that includes both optical and capacitive sensors can acquire images of both a light reflection image of fingerprint and also a capacitive coupling image. The sensing top electrode 534 serves two different functions: 1) capacitive sensing, and 2) as a collimator by having one or more holes on the sensing top electrode 534 to direct, narrow or focus reflected light from the finger toward the photodetector 533 so that the effective detected numeral aperture can provide a sufficient spatial resolution to image the fingerprint by the optical sensing only. Reusing the sensing top electrode 534 eliminates the need for additional metal layer or optical fiber bundle, and thus reduces each pixel size and accordingly the overall size of the fingerprint sensor device 530.

Figure 6:
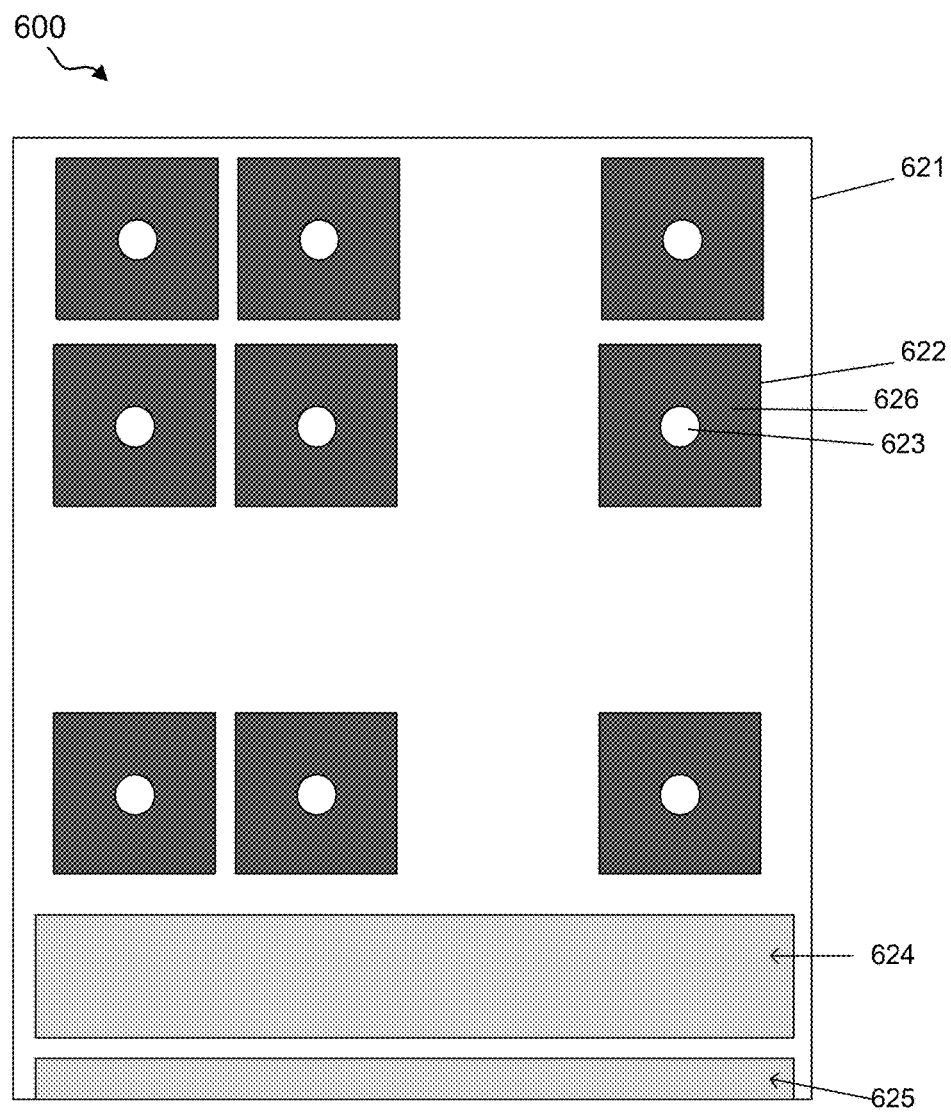
FIG. 6 is a top-down view of an exemplary hybrid fingerprint sensor device incorporating both an optical sensor and a capacitive sensor in each hybrid sensing pixel.

FIG. 6 is a top-down view of an exemplary hybrid fingerprint sensor device 600 incorporating both an optical sensor and a capacitive sensor in each hybrid sensing pixel. The fingerprint sensor device 600 is implemented as a CMOS silicon chip 621 that includes an array of hybrid (incorporating both an optical sensor and a capacitive sensor) sensing elements or pixels 622. The size or dimension of the sensing elements can be in the range of 25 μm to 250 μm, for example. The hybrid sensor device 600 can include an array of support circuitry including amplifiers, ADCs, and buffer memory in a side region 624. In addition, the hybrid sensor device 600 can include an area for wire bonding or bump bonding 625. A top layer 626 of the hybrid sensor element 622 can include a metal electrode for capacitive sensing. One or more openings or holes 623 can be fabricated on each top metal electrode 23 to structurally serve as a collimator for directing light in a vertical direction to shine on a photodetector under the top electrode. Thus, the top layer 626 structure can serve dual purposes of optical and capacitive sensing. A sensor device processor can be provided to process the pixel output signals from hybrid sensing pixels to extract the fingerprint information.

In addition to sharing the same structure for capacitive sensing and for focusing light in the vertical direction as a collimator, one instance of sensor signal detection circuitry can be shared between the optical and capacitive sensors to detect the sensor signals from both a photodetector and a capacitive sensor plate.

Figure 7A:
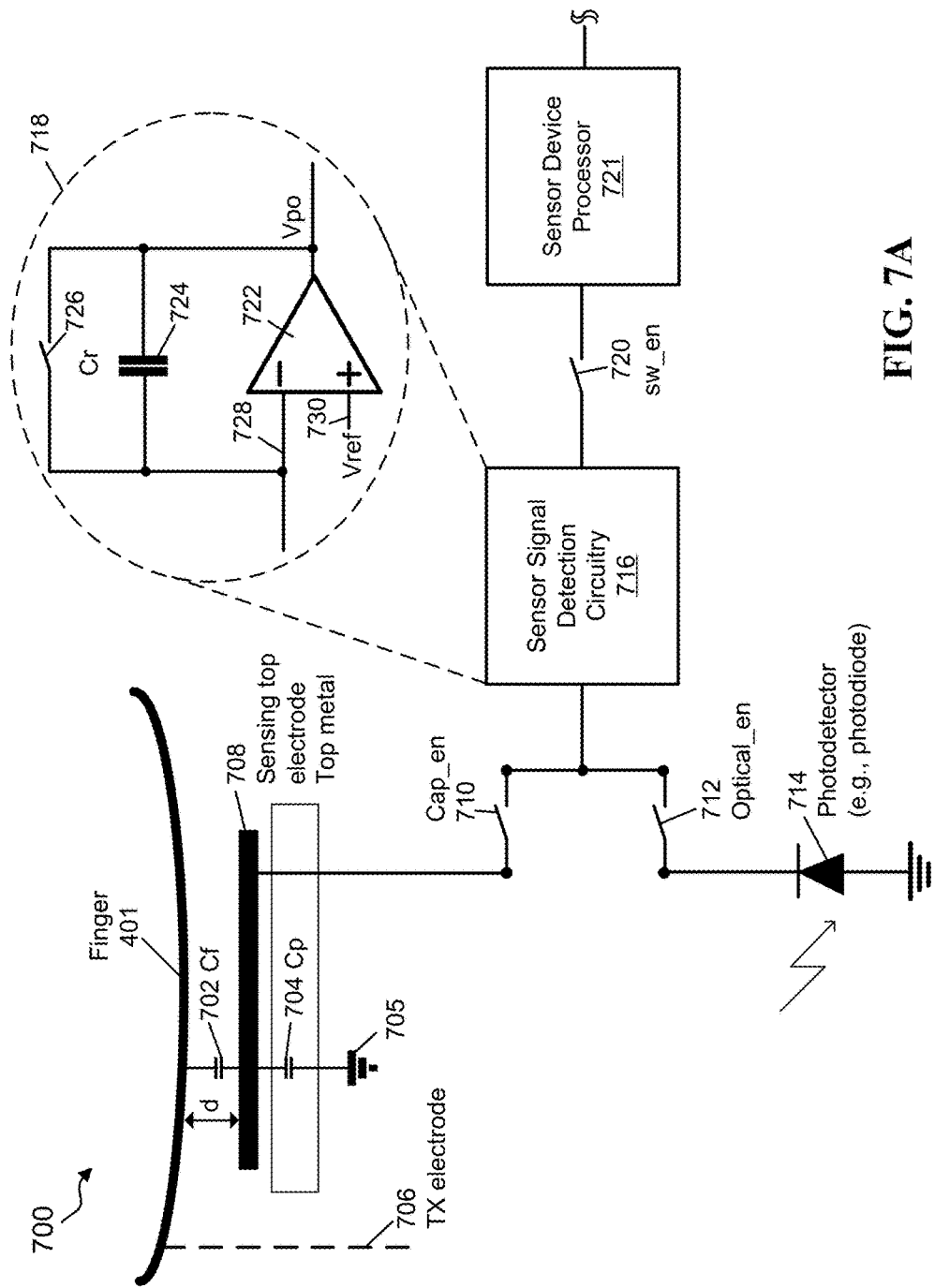
FIG. 7A illustrates a circuit diagram for an exemplary hybrid fingerprint sensing element or pixel having both capacitive sensing and optical sensing functions for fingerprints.

FIG. 7A illustrates a circuit diagram for an exemplary hybrid fingerprint sensing element or pixel 700 having both capacitive sensing and optical sensing functions for fingerprints. The exemplary sensor pixel 700 includes sensor signal detection circuitry 716 to selectively switch between detecting or acquiring sensor signals from a sensing top electrode (e.g., a top metal layer) 708 based on capacitive sensing and a photodetector (e.g., a photodiode) 714 based on optical sensing to acquire both a reflective optical image from the photodetector 714 and a capacitive coupled image from the capacitive sensor electrode 708 from a finger. In some implementations, the two images from the two sensing mechanisms in each hybrid sensing pixel can be serially processed by the sensor signal detection circuitry 711. In the illustrated example, switches 710 and 712 have first terminals that are electrically coupled to the sensing top electrode 708 and the photodetector 714, respectively, and second terminals that are coupled to a common input terminal of the sensor signal detection circuitry 716 to provide corresponding the optical detector signal from the photodetector 714 and the capacitive sensing signal from the sensing top electrode 2108 to the sensor signal detection circuitry 716. When the switch 710 is turned off (CAP_EN=0) and the switch 712 is turned on (Optical_en=1), the sensor signal detection circuitry 716 acquires the optical detector signal representing the optical image of the scanned fingerprint received at the particular hybrid sensing pixel. The sensor signal detection circuitry 716 can acquire the capacitive sensing signal representing the capacitive image of the scanned fingerprint when switch 710 CAP_EN=1 and Optical_en=0. After both the optical and capacitive images are acquired, both images can be processed in downstream circuitry separately and in combination to identify the fingerprint characteristics.

With the two modality of imaging by the above hybrid sensing pixels, the performance of the fingerprint identification can be enhanced by making use of the two types of the images in different ways. This enhanced fingerprint identification can be achieved by the sensor device processor, such as sensor device processor 721, for processing the pixel output signals from the hybrid sensing pixels to extract the fingerprint information. For example, the capacitive image can provide a 3D image on the depth of the ridges and valleys of the fingerprint features. Complementing the 3D capacitive image, the optical image can provide a high resolution 2D information on the fingerprint characteristics. The optical 2D image having a higher spatial resolution can be used to recover the capacitive sensing image resolution because both images information on the same ridges of the fingerprint. In some implementations where the capacitive sensing method may be more sensitive and accurate on identifying the valleys of the fingerprint than the optical sensing method, the spatial resolution of images acquired using the capacitive sensing method can degrade based on the thickness of the cover. This aspect of the capacitive sensing can be supplemented by the optical sensing. In operation, the sensor response may be fixed and the point spread function of the capacitive sensor may be fixed for all sensor positions. The higher resolution optical sensing can be used as a resolution recovery method and can be applied on the capacitive sensing image to enhance the 3D image. A partial high resolution image from optical sensing can be available to help with the recovering method. Thus, the 3D capacitive image can be enhanced to provide more information on the valleys and ridges by interpolating or recovering based on the high resolution 2D image.

The enhanced 3D image can provide an improved fingerprint recognition and matching. In another example, the optical and capacitive images can be stored together to provide two comparisons each time a fingerprint recognition or matching is performed. The use of two types of images for comparison enhances the accuracy and security of the fingerprint sensing system.

The sensor signal detection circuitry 716 can be implemented in various ways using a number different circuitry designs. In one example, integrator sensing circuitry 718 can be implemented to store the electric charges caused by ridges and valleys touching or being substantially near the cover of the fingerprint sensor device of the cover of the mobile device. The inclusion of the integrator circuitry 718 enhances the signal-to-noise ratio (SNR). The integrator sensing circuitry includes an operational amplifier 722 to amplify a sensor signal, such as a capacitance related or optical related signal (e.g., voltage signal), detected by the sensing top electrode 708 or the photodetector 714 of the exemplary sensor pixel 700. The sensing top electrode 708 that include a conductive material, such as one of a variety of metals is electrically connected to a negative or inverting terminal 728 of the amplifier 722 through the switch 710. The sensing top electrode 708 and a local surface of the finger 702 function as opposing plates of a capacitor Cf 702. The capacitance of the capacitor Cf 702 varies based on a distance 'd' between the local surface of the finger 202 and the sensing top electrode 708, the distance between the two plates of the capacitor Cf 702. The capacitance of capacitor Cf 702 is inversely proportional to the distance 'd' between the two plates of the capacitor Cf 702. The capacitance of capacitor Cf 702 is larger when the sensing top electrode 708 is opposite a ridge of the finger 702 than when opposite a valley of the finger 702.

In addition, various parasitic or other capacitors can be formed between different conductive elements in the exemplary sensor pixel 700. For example, a parasitic capacitor CP 2104 can form between the sensing top electrode 708 and a device ground terminal 705. Device ground is coupled to earth ground closely. Another capacitor Cr 724 can form between an output conductor of the amplifier 722 and the negative or inverting terminal 728 of the amplifier 722 and functions as a feedback capacitor to the amplifier 722. Also, a switch 726 can be coupled between the output of the amplifier 722 and the negative or inverting terminal 728 of the amplifier 722 to reset the integrator circuitry 718.

The positive terminal of the amplifier 722 is electrically connected to an excitation signal Vref. The excitation signal Vref can be directly provided to the positive terminal of a dedicated amplifier in each sensor pixel. By providing the excitation signal Vref directly to the positive terminal of the amplifier 722, the exemplary sensor pixel 700 becomes an active sensor pixel. In addition, providing the excitation signal Vref directly to the positive terminal of the amplifier 722 eliminates the need to include an excitation electrode, common to all sensor pixels, which reduces a conductive (e.g., metal) layer from the semiconductor structure of the sensor chip. In some implementations, an optional excitation electrode 706 can be implemented to enhance the SNR based on the design of the sensor pixel. In addition, by providing the excitation signal Vref 730 directly to the amplifier 722, the excitation signal Vref 722 is not applied directly to the finger 202 to avoid potentially irritating or injuring the finger 202. Moreover, when the excitation electrode for applying the excitation signal directly to the finger is not used, all components of the fingerprint sensor device can be integrated into a single packaged device, and the entire fingerprint sensor device can be disposed under the protective cover glass. With the entire fingerprint sensor device disposed under the protective cover glass, the fingerprint sensor device is protected from the finger and other external elements that can potentially damage the fingerprint sensor.

In FIG. 7A, the output signal (optical and capacitive) of the sensor signal detection circuitry 716 (e.g., Vpo of the amplifiers 722) in the sensor pixels 700 is electrically coupled to a switch 720 to selectively output the output signal Vpo from the sensor pixel 700 to a signal processing circuitry including a filter. The switch 720 can be implemented using a transistor or other switching mechanisms and electrically coupled to a controller to control the switching of the switch 720. By controlling the switches 720, 710 and 712, the sensor pixels in an array of sensor pixels can be selectively switched between acquiring the optical signals and the capacitive signals. In one implementation, the optical or capacitive signal can be acquired for each line, row or column of sensor pixels in the array and then switched to acquire the other type of signal for the line, row or column. The switching between the optical and capacitive signal acquisition can be performed line-by-line. In another implementation, one type of signal (capacitive or optical) can be acquired for all sensor pixels or elements in the array and then switched to acquire the other type of signal for all of the sensor pixels or elements. Thus, the switching between acquisition of different signal types can occur for the entire array. Other variations of switching between acquisition of the two types of sensor signals can be implemented.

Figure 7B:
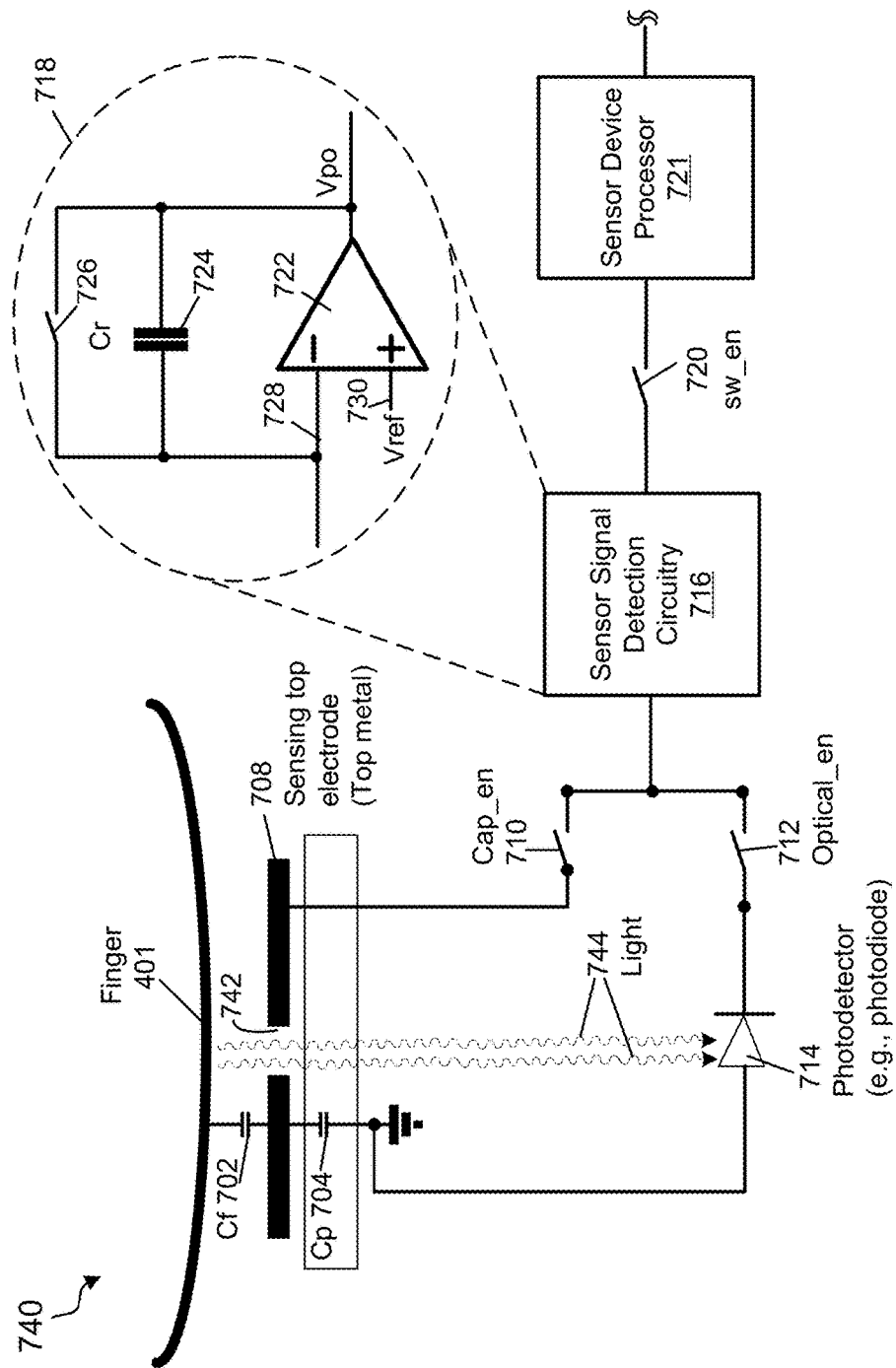
FIG. 7B illustrates a circuit diagram for another exemplary hybrid fingerprint sensing element or pixel.

FIG. 7B illustrates a circuit diagram for another exemplary hybrid fingerprint sensing element or pixel 740. The hybrid fingerprint sensing element or pixel 740 is substantially the same as the hybrid fingerprint sensing element or pixel 700 with respect to the components having the same reference number. For descriptions of the common components having the same reference number, refer to the description of FIG. 7A.

The hybrid fingerprint sensing element or pixel 740 implements the sensing top electrode 708 to include a hole or opening 742 that functions as a collimator to focus or narrow the reflected light 744 toward the photodetector 714 (e.g., photodiode). The photodetector 714 can be positioned or disposed below the collimator implemented using the sensing top electrode 708 to capture the reflected light 744 focused by the collimator 708.

Figure 7C:
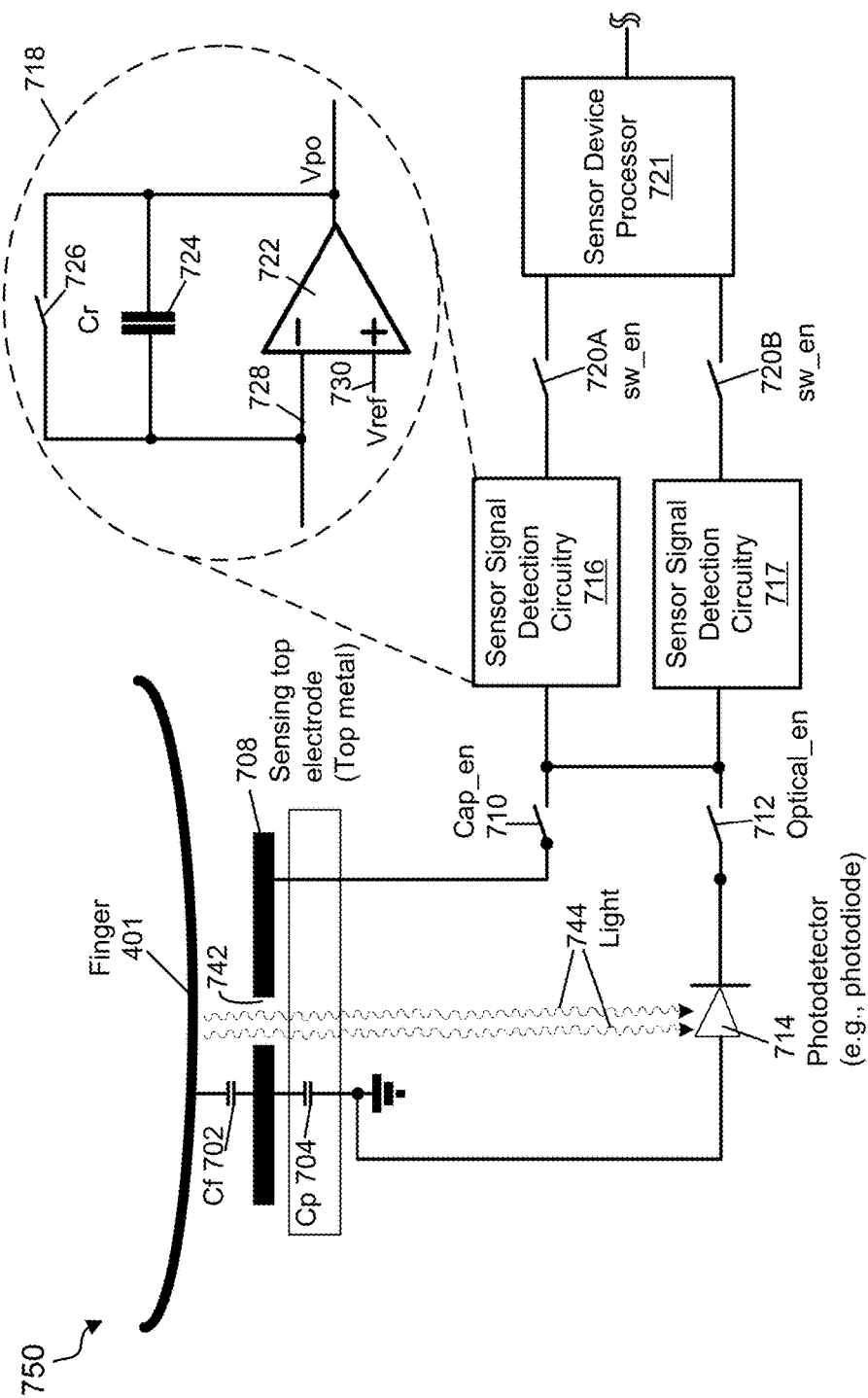
FIG. 7C illustrates a circuit diagram of an exemplary hybrid fingerprint sensing element or pixel for performing parallel detection of sensor signals from the photodetector and the capacitive sensor plate.

In some implementations, separate instances of sensor signal detection circuitry can be included for the optical and capacitive sensors to detect in parallel the sensor signals from both a photodetector and a capacitive sensor plate. FIG. 7C illustrates a circuit diagram of an exemplary hybrid fingerprint sensing element or pixel 750 for performing parallel detection of sensor signals from the photodetector and the capacitive sensor plate. The hybrid fingerprint sensing element or pixel 750 is substantially the same as the hybrid fingerprint sensing element or pixel 740 with respect to the components having the same reference number. For descriptions of the common components having the same reference number, refer to the description of FIG. 7A.

To perform sensor signal detection from both the capacitive plate and the photodetector in parallel, the hybrid fingerprint sensing element or pixel 750 includes separate sensor signal detection circuitry 716 and 717 communicatively coupled to the sensing top electrode 708 and the photodetector 724 respectively. Sensor signal detection circuitry 717 can be implemented to be substantially similar to sensor signal detection circuitry 716. In some implementations, switches 710 and 712 can be disposed to have first terminals that are electrically coupled to the sensing top electrode 708 and the photodetector 714, respectively, and second terminals that are coupled to respective sensor signal detection circuitry 716 and 717 to provide the optical detector signal from the photodetector 714 and the capacitive sensing signal from the sensing top electrode 708 to the sensor signal detection circuitry 716 and 717 respectively. When the switches 710 and 712 are turned on and off together, the sensor signal detection circuitry 716 and 717 can perform sensor signal detection from the capacitive plate 708 and the photodetector 714 in parallel. When the switches 710 and 712 are turned on and off out of phase with each other, the sensor signal detection circuitry 716 and 717 can perform sensor signal detection from the capacitive plate 708 and the photodetector 714 in series. In addition, the sensor device processor 721 can be communicatively coupled to the sensor signal detection circuitry 716 and 717 either directly or indirectly through switches 720A and 720B to process the detected sensor signals from the capacitive plate 708 and the photodetector 714 in parallel or in series.

In another aspect of the disclosed technology, the optical sensor described with respect to FIGS. 5A, 5B, 6, 7A and 7B can be used to measure human heart beat by measuring the reflected light intensity change with time caused by blood flow variations in fingers due to the heart beat and pumping actions of the heart. This information is contained in the received light that is reflected, scattered or diffused by the finger and is carried by the optical detector signal. Thus, the optical sensor can serve multiple functions including: (1) acquiring an optical image of the fingerprint as a second fingerprint sensor based on optical sensing in addition to the first fingerprint sensor based on capacitive sensing pixels, and (2) operating as an optical anti-spoofing sensor to provide different measurements for anti-spoofing detection, including measuring presence of blood in the finger, measuring dynamics of the finger movement and properties, measuring scattered light patterns of probe light from the finger for live finger detection, measuring human heart beat, etc. In implementations, a sensor device processor is used to process one or more optical detector signals to extract the heart beat information. This sensor device processor may be the same sensor device processor that processes the pixel output signals from optical sensing pixels or hybrid sensing pixels to extract the fingerprint information.

Figure 8:
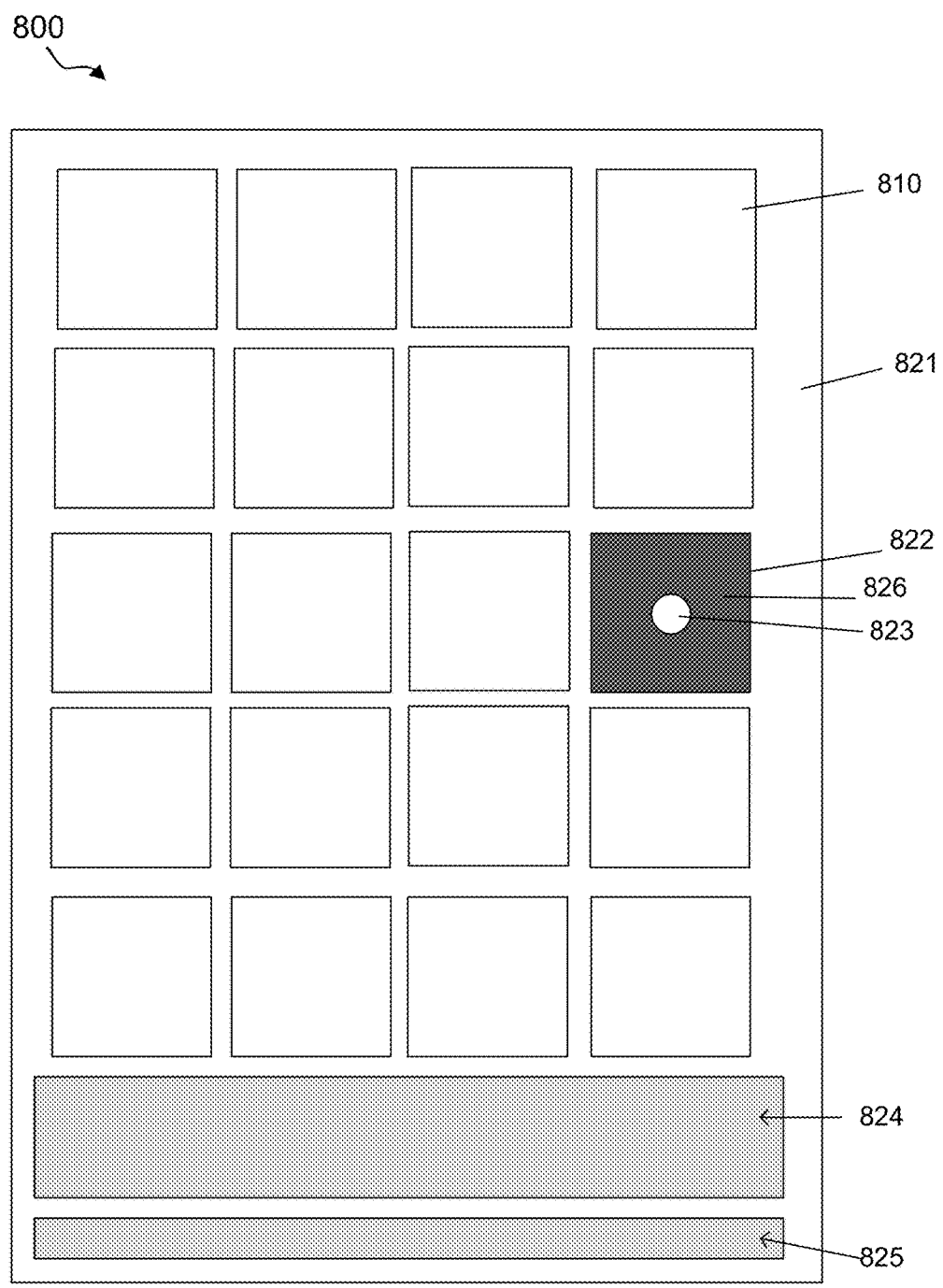
FIG. 8 is a block diagram of an exemplary fingerprint sensor array that includes both capacitive sensors and photodetectors.

FIG. 8 is a top-down view of an exemplary fingerprint sensor device 800 that includes both capacitive sensors and photodetectors. The fingerprint sensor device 800 is implemented as a CMOS silicon chip 821 that includes an array of both optical sensors 822 and capacitive sensors 810. Thus, different pixels can be different type of sensors. The size or dimension of the sensing elements can be in the range of 25 μm to 250 μm, for example. The fingerprint sensor device 800 can include an array of support circuitry including amplifiers, ADCs, and buffer memory in a side region 824. In addition, the fingerprint sensor device 800 can include an area for wire bonding or bump bonding 825. One or more openings or holes 823 can be fabricated on each top layer 826 to structurally serve as a collimator for directing light in a vertical direction to shine on a photodetector under the top layer. A sensor device processor can be provided to process the pixel output signals from hybrid sensing pixels to extract the fingerprint information.

In addition to sharing the same structure for capacitive sensing and for focusing light in the vertical direction as a collimator, one instance of sensor signal detection circuitry can be shared between the optical and capacitive sensors to detect the sensor signals from both a photodetector and a capacitive sensor plate.

The fingerprint sensor array 800 includes capacitive sensors 810 and an optical sensor 822, such as a photodetector. The example shown in FIG. 8 includes only one optical sensor because the optical sensor does not need to capture the fingerprint information. This particular example is different from the designs in FIGS. 5A through 7C where the optical sensors integrated with the capacitive sensors can operate as a second fingerprint sensor based on optical sensing. Rather the optical sensor 822 is designed to capture the light scattered from the finger to perform live-finger detection as described in this patent document. The fingerprint sensor information is captured by the capacitive sensors. However, in some implementations, two or more optical sensors 822 can be provided to enhance the live-finger detection.

Live Finger Detection Based on Optical Absorption in Blood at Different Optical Wavelengths A finger of a live person carries the blood flows which vary with the person's heartbeat, the pressing force against the sensor, the breathing etc. The tissues in the finger scatter a portion of light which can be detected by an optical sensor described in this document for anti-spoofing detection. By analyzing the signals received at one or optical sensors, a sequence of signals can be obtained and processed to determine whether there is a flowing blood in the object in contact with the fingerprint sensor module. The micro movement of the fingerprint can be used to indicate whether the fingerprint is from a live person. A sequence of fingerprint images are used to recover the signal amplitude and bright spots distribution change with time. A fake, non-live-finger manifests different dynamics from a live finger.

Figure 9A:
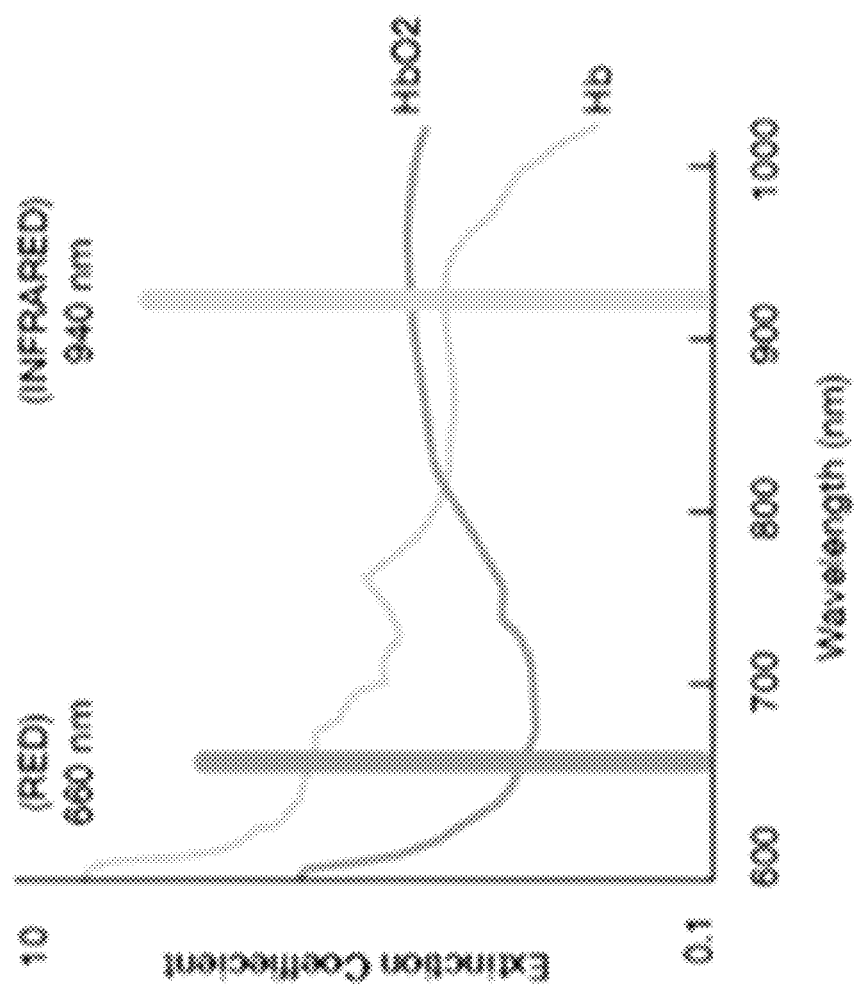
FIGS. 9A and 9B illustrate optical sensing for live finger detection based on different optical absorption behaviors at different optical wavelengths in blood.

FIG. 9A shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a visible wavelength and an IR wavelength, the differences in the optical absorption can be captured determine whether the touched object is a finger from a live person. Accordingly, each light source disclosed herein can be configured to emit probe light at least two different optical wavelengths to use the different optical absorption behaviors of the blood for live finger detection. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 9B:
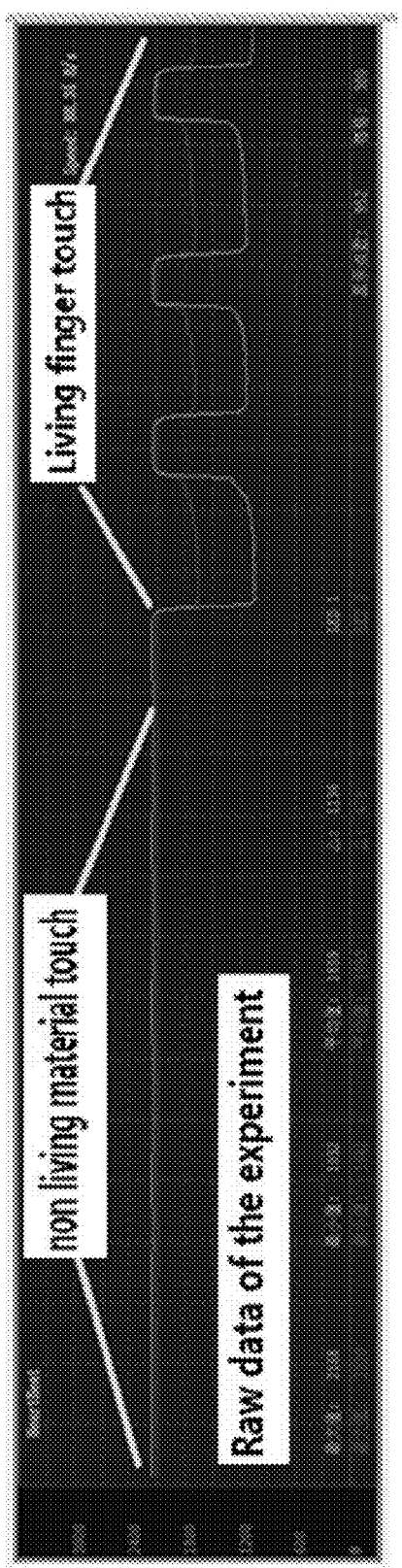

FIG. 9B shows a comparison between optical signal behaviors in the reflected light from a nonliving material (e.g., a fake finger) and a live finger. The optical fingerprint sensor can also operate as a heartbeat sensor to monitor a living organism. When two or more wavelengths of the probe light are detected, the extinction ratio difference can be used to quickly determine whether the monitored material is a living organism, such as live fingerprint. In the example shown in FIG. 9B, probe light at different wavelengths were used, one at a visible wavelength and another an IR wavelength as illustrated in FIG. 9A.

When a nonliving material touches the top cover glass above the fingerprint sensor module, the received signal reveals strength levels that are correlated to the surface pattern of the nonliving material and the received signal does not contain signal components associated with a finger of a living person. However, when a finger of a living person touches the top cover glass, the received signal reveals signal characteristics associated with a living person, including obviously different strength levels because the extinction ratios are different for different wavelengths. This method does not take long time to determine whether the touching material is a part of a living person. In FIG. 9B, the pulse-shaped signal reflects multiple touches instead of blood pulse. Similar multiple touches with a nonliving material does not show the difference caused by a living finger.

This optical sensing of different optical absorption behaviors of the blood at different optical wavelengths can be performed in a short period for live finger detection and can be faster than optical detection of a person's heart beat using the same optical sensors.

Optical Anti-Spoofing Detection Based on Distributed Optical Detectors

Referring to FIG. 2B, different optical detectors 35 are located at different positions in the fingerprint sensor module 23a or 23b to perform optical anti-spoofing detection. As illustrated in FIG. 2C where a hacker uses a fake fingerprint pattern layer 77f over the hacker's finger 77 to break in the fingerprint sensing security system, it is may not be sufficient to simply detect presence of blood in the input finger. Using optical sensors 35 at different locations can be used to detect scattered probe light from the finger at different locations or from different directions to provide anti-spoofing detection.

In the optical layout in the design 23a in FIG. 2B where different optical sensors 33 are districted at different locations, at least one optical sensor 33 is placed at or near a central location of the fingerprint sensor 24 for optical anti-spoofing detection. When the light sources 33 are operated to emit light at different optical wavelengths, the optical sensor 33 located at or near a central location of the fingerprint sensor 24 can receive scattered light from a location where the fake fingerprint pattern layer 77f will be present and cause the light scattering or reflection. If the hacker uses a non-transparent fake fingerprint 77f, the scattered probe light from the non-transparent fake fingerprint pattern layer 77f does not carry information associated with blood of the hacker, e.g., the optical absorption characteristics of blood at different optical wavelengths. Therefore, the optical sensor 33 located at or near a central location of the fingerprint sensor 24 can detect this feature while another optical sensor 33 located at other locations such as the edge of the fingerprint sensor 24 may receive scattered probe light from the hacker's finger that reflects different optical absorption characteristics of blood at different optical wavelengths.

The distributed optical sensor arrangement in FIG. 2B can also be used to provide anti-spoofing detection when a hacker uses an optically transparent fake fingerprint pattern layer 77f in a fingerprint spoofing attack where the transparent fake fingerprint material forms a light path to allow the probe light to transmit through to reach the hacker's live finger and to return the scattered light back into the optical sensors 35. The optical sensors 35 distributed within the fingerprint sensing area can determine the difference in the scattered probe light pattern between the case where the transparent fake fingerprint 77f is in direct contact with the fingerprint sensing area 21 and the case where the fingerprint sensing area 21 is in the direct contact with the live finger without the transparent fake fingerprint 77f.

Notably, different optical interfacing conditions are present at the sensing surface when the non-transparent fake fingerprint pattern layer 77f is in direct contact with the fingerprint sensing area 21 and when the live finger is in direct contact with the fingerprint sensing area 21. First, the optical refractive indices of the non-transparent fake fingerprint pattern layer 77f and a live finger are different. This creates different optical reflections and different refracted light that passing through the interface to enter the non-transparent fake fingerprint pattern layer 77f or the skin of a finger, and further creates different total internal reflection conditions at the interface. Second, the optical absorption measurements obtained at the distributed optical sensors 35 at different locations are different when a finger directly touches the fingerprint sensing surface or the finger indirectly touches through a transparent fake fingerprint pattern layer 77f. Optical measurements by the distributed optical sensors 35 at different locations for probe light at different optical wavelengths where the blood exhibits different optical absorption characteristics can allow the above differences to be detected for anti-spoofing sensing.

Figure 10:
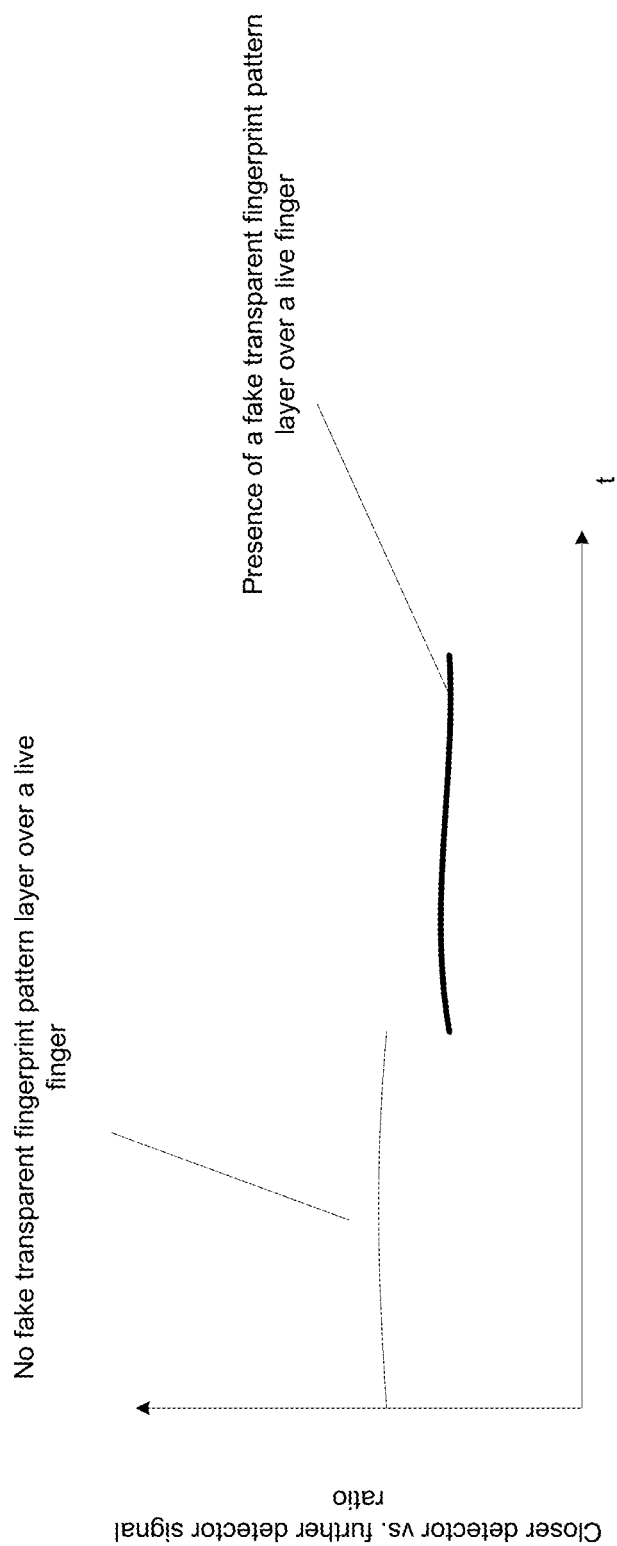
FIG. 10 shows an example for using spatially distributed optical sensors for live finger detection.

FIG. 10 illustrates measurements of optical detector ratios of different optical sensors 33 to detect whether a transparent fake fingerprint pattern layer 77f is used by a hacker. Measurements of the signal amplitude ratio between a closer photo detector 35 and a further away photo detector 33 can be used to determine if there is a fake fingerprint material under the live finger. When there is no fake fingerprint material, the signal ratio is at a high ratio. When a transparent fake fingerprint material is applied, the ratio is at a lower ratio.

Optical Fingerprint Sensor

FIGS. 4A-4C provide examples of capacitive fingerprint sensors for the designated fingerprint sensor in FIG. 1A. FIGS. 5A-7C provide examples of optical sensors that are integrated with capacitive sensors where the optical sensors can be used to capture fingerprints in addition to fingerprints captured based on capacitive sensing. The designated fingerprint sensor in FIG. 1A can also be an optical fingerprint sensor which can be implemented in various configurations including the optical sensors described in FIGS. 5A-7C without the corresponding capacitive sensing part as illustrated by an example in FIG. 12.

Figure 11:
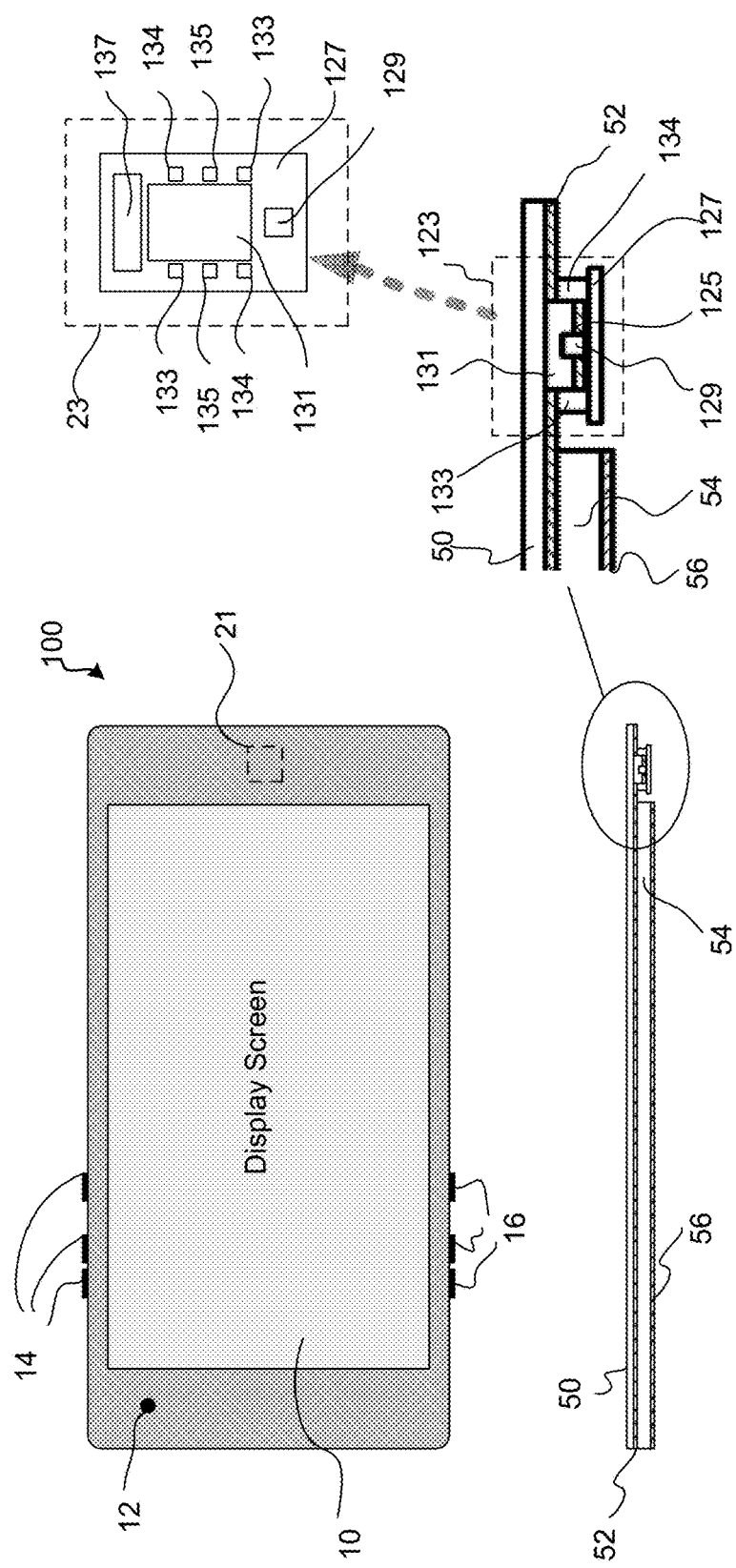
FIGS. 11, 12 and 13 show examples of optical fingerprint sensor designs.
Figure 12:
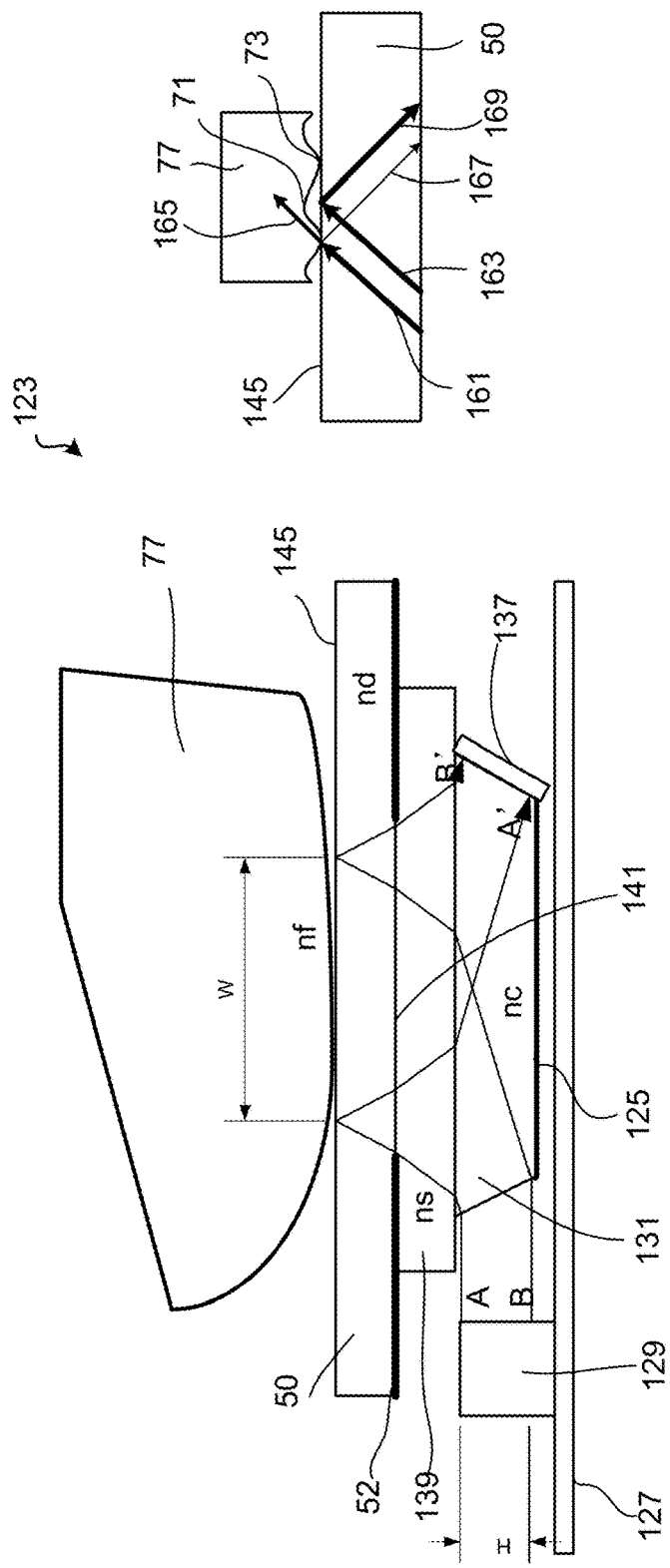
Figure 13:
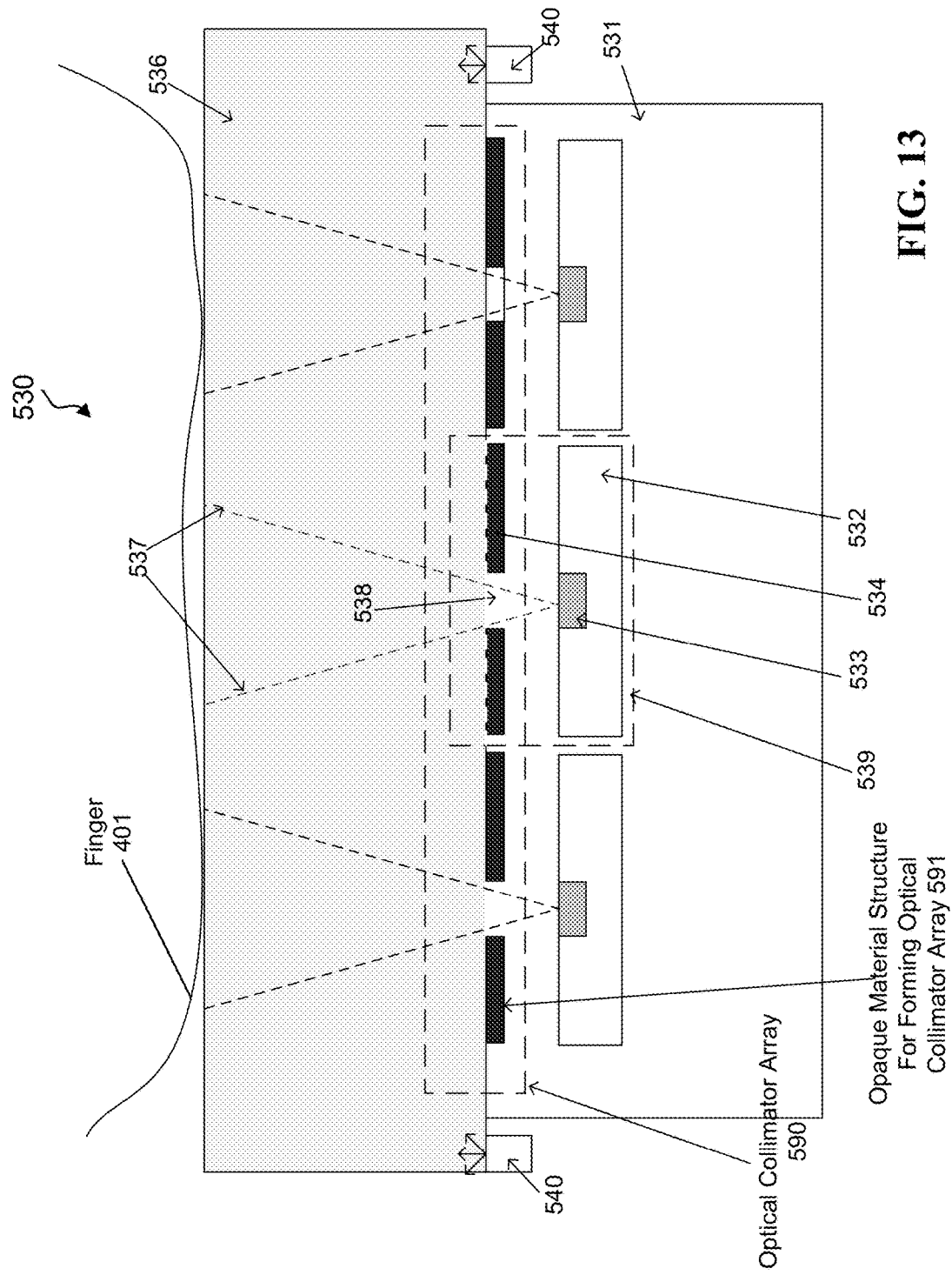

FIG. 11 is a diagram showing an exemplary optical fingerprint sensor packaged under a screen cover glass of a platform, such as a smart phone, a tablet or a portable electronic device. FIG. 12 further illustrates an exemplary fingerprint sensing light paths of the device in FIG. 11.

In FIG. 11, the exemplary optical fingerprint sensor 123 is packaged under a screen cover glass, such as an enhanced cover glass 50 of a platform 100, such as a smartphone. The location of the optical fingerprint sensor 123 is shown by a fingerprint sensor mark 21 in the top-down view in the upper left side of FIG. 11. The smartphone platform 100 includes a touch panel assembly 10, other sensors 12, such as a camera, and physical buttons 14 and 116 on the side. Under the cover glass 150 can include a color material layer 52, display layers 54 (e.g., OLED layers or LCD layers) as part of the display screen in the touch panel assembly 10, and bottom layers 56 of the display screen in the touch panel assembly 10. Also, the touching sensing layers may also be placed to overlay the display layers 54 to provide the touching sensing functions.

In the optical fingerprint sensor design in FIG. 11, the packaging design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. The fingerprint sensor 123 formed in the area 21 for optical fingerprint is located under the top cover glass or layer 50 so that the top surface of the cover glass or layer 50 serves as the top surface of the device as a contiguous and uniform glass surface across both the display screen of the touch display assembly 10 and the optical detector sensor module 23.

The optical fingerprint sensor 123 disposed under the cover glass 50 can include an optical coupler 131 disposed over a matched color material layer 125 and a probe light source 129. The matched coupler 131, the matched color material layer 125, and the probe light source 129 are disposed over a circuit 127, such as a flexible printed circuit (FPC) with desired circuit elements. Also disposed on the FPC 127 are light sources for liveness detection 33, photo diodes for liveness detection 134, light sources for decorating illumination 135, and a photo diode array 137.

The light coupler 131 is fixed onto the cover glass 50 and an underlying spacer material 139 as shown in FIG. 12. The probe light source 129 is fixed at a proper position so that the probe light beam or a portion of the probe light beam may be projected into the coupler 131 at desired angles. The coupler 131, the spacer material 139, and the cover glass 50 can each be made of multiple layers. The photo diode array 137 is fixed at a proper position to receive the reflected probe light beam A'B' for capturing the optical image of the fingerprint pattern carried by the reflected probe light beam A'B'.

Probe light source 129 projects probe light beam AB into coupler 131 which further directs the probe light beam AB through the opening of the optional color material layer 52 onto the fingerprint sensing surface 145 on the top of the cover glass 50 to illuminate the finger in contact. The light beam AB is coupled into cover glass 50 with the help of the spacer material 139 placed underneath the cover glass 50. When nothing is placed on the top sensing surface 145 of the cover glass 50, a portion or all of the probe light beam power is reflected into the spacer 139, and this reflected light enters into coupler 131 and forms the reflected probe light beam A'B'. The reflected probe light beam A'B' is received by the matched optical sensor array 137 (e.g., a photo diode array) which converts the optical image carried by the reflected probe light beam A'B' into an array of detector signals for further processing.

When a finger 77 touches the sensing surface 145 of the cover glass 50, the fingerprint ridges 73 change the local surface reflectance as shown by the right figure in FIG. 12. A portion 161 of the probe light incident on the finger ridge is refracted as light 165 that is scattered in the finger 77, the rest is reflected as light 167 that is reflected by the finger ridge. The fingerprint valleys are separate from the sensing surface 145 and generally do not significantly change the local surface reflection at the sensing surface 145. The incident light 163 that is incident on the fingerprint valleys is reflected as light 169 that is reflected by the sensing surface 145. The reflected probe light beam A'B' carries the fingerprint signals. Similarly, when something other than a finger skin touches the sensing surface 145 of the cover glass 50, the reflected probe light beam A'B' carries the touching material information, which is different from a live fingerprint.

In the example of FIGS. 11 and 12, the materials of the coupler 131, spacer 139, and cover glass 50 are of a proper level of optical transparency so that the probe light beam can be transmitted in and through them. The refractive index of the coupler 131 is nc, the refractive index of the spacer material 139 is ns, the refractive index of the cover glass 50 is nd, and the refractive index of the touching material is nf. The probe light beam's propagating directions are decided by these materials' refractive indexes.

The desired probe light beam angles may be realized by proper design of the light source 129 and the end surface tilting angle of the coupler 131. The divergent angle of the probe light beam is controlled by the structures of the light source 129 and the shape of the coupler 131's end surface.

To obtain a clear fingerprint image without an optical lens, normally the light source 129's emitting area should be small as a point light source, or the probe light beam should be collimated. A small LED light source can be installed far away from the coupler 131 to achieve this in the optical system shown in FIG. 12.

By matching proper refractive indexes (nc, ns, nd, nf) of the materials in the optical fingerprint sensor and initiating the probe light beam incident angles, the probe light beam can be designed to be totally reflected or partially reflected at the sensing surface 45. For example, such an optical sensor can be designed so that the probe light beam is totally reflected when the touch material is water having a refractive index of about 1.33 at 589 nm, and partially reflected when the touch material is finger skin having a refractive index of about 1.44 at 589 nm.

The probe beam AB size is defined as H at the incident end of the coupler 131. The probe beam size may be W at the sensing surface 145. By matching the refractive indexes of all of the materials and the shape of the coupler 131 and spacer 139, W may be set to be greater than H. Namely, the received probe light beam A'B' may be smaller than the probe light beam at the sensing surface 45. The compression ratio is typically decided by refractive indexes nc and nd. This is an effective method to image a large area with a small detector array without using an imaging lens. In addition, by adjusting the probe light beam divergent angle and the photo diode array tilting angle, the compression ratio can be further adjusted at all dimensions. The reflection from the coupler-spacer interface and from the spacer-cover interface constitutes optical noise and can be removed in the processing of the outputs of the optical detectors in the optical sensor array 137.

In some implementations, the probe light source 129 may be modulated. The matched photo diode array should be designed to be high efficiency and to work in all optical illumination environments.

The optical fingerprint sensor in FIGS. 11 and 12 can be configured with sensor area decorating. When the optical fingerprint sensor is installed under the cover glass 50, an optical window should be opened for the light path. Specifically, a portion of the cover glass' color coating is removed. Because the fingerprint sensor detector is arranged to be at one end of the coupler 131, the bottom of the coupler 131 may be painted with color layers 125. The painted color layers 125 can be selected to match with the platform surface color. For example, to use same color or pattern under the coupler so that the sensor becomes invisible. In some implementations, the matched coupler 131 may also be painted with a desired or different color or pattern to achieve certain or different decorative effects or styles. The matched coupler 131 may also be painted with certain patterns or signs, such as a homing button sign.

The design provides an attractive option to further decorate the sensor area. For example, the illumination light source 135 can be used to produce different colored light waves to illuminate the sensor area. This can be useful in dark environments when the bell rings on the smartphone to indicate where the fingerprint sensing area is located.

FIG. 12 illustrates another example of an optical fingerprint sensor based on the optical sensor design in FIG. 5B by removing the corresponding capacitive sensing part as illustrated in FIG. 5B. An optical collimator array 590 is formed above the optical detectors 533 as optical sensing pixels. The optical collimator array 590 includes optical collimators formed in an opaque material structure 591 that is fabricated to have openings or light transmission tunnels 533 over photodetectors 533 to function as optical collimators for directing light onto the respective photodetectors 533. The optical collimator array 590 may also be structured similar to the collimator 506 in FIG. 5A and may be implemented using an optical fiber bundle of different fibers or one or more metal layer(s) with holes or openings.

Additional Capacitive Fingerprint Sensor Designs

Figure 14:
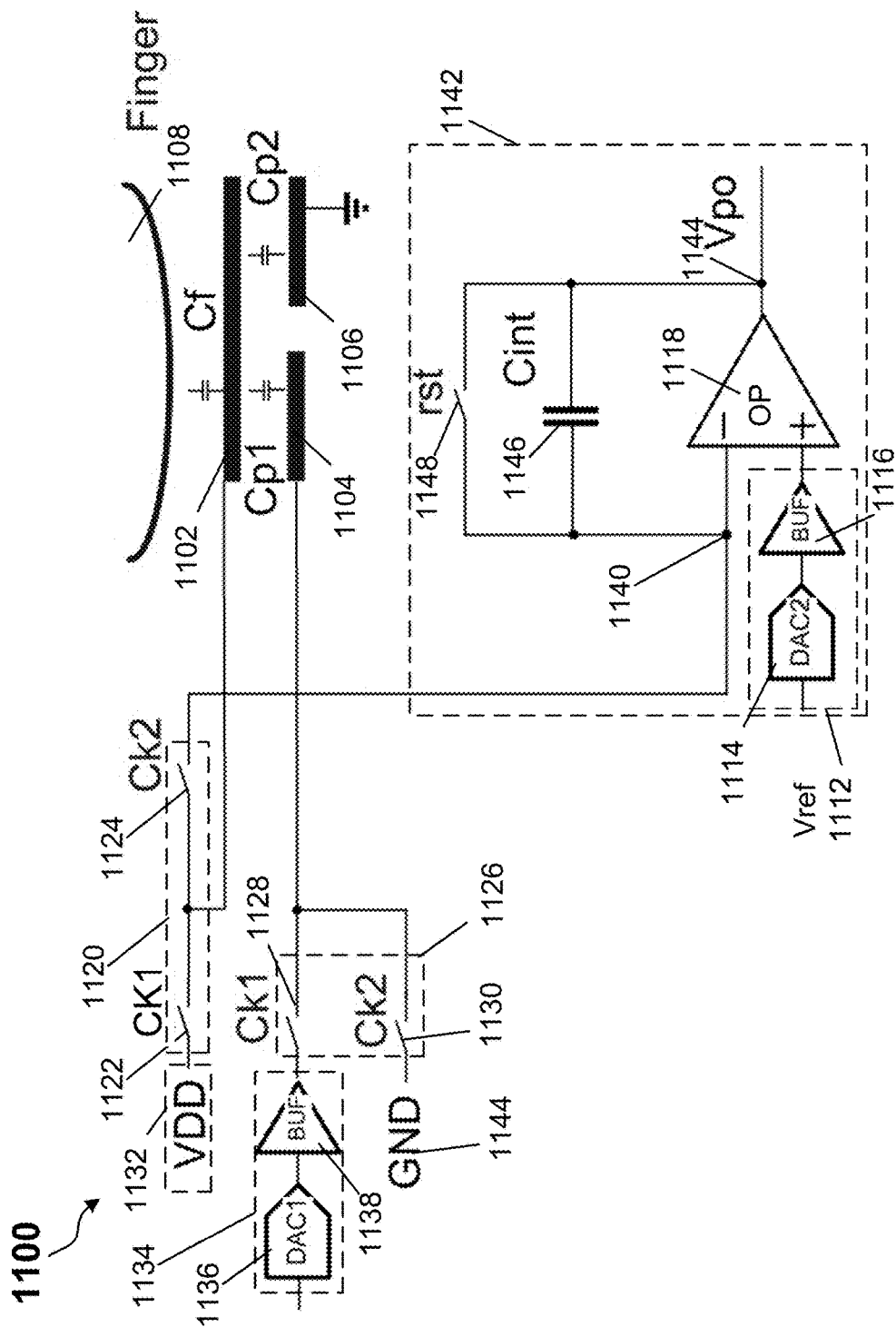
FIGS. 14, 15 and 16 show additional examples of capacitive fingerprint sensors that can be used for the design in FIG. 1A where each figure shows an example of a sensor pixel circuit.
Figure 15:
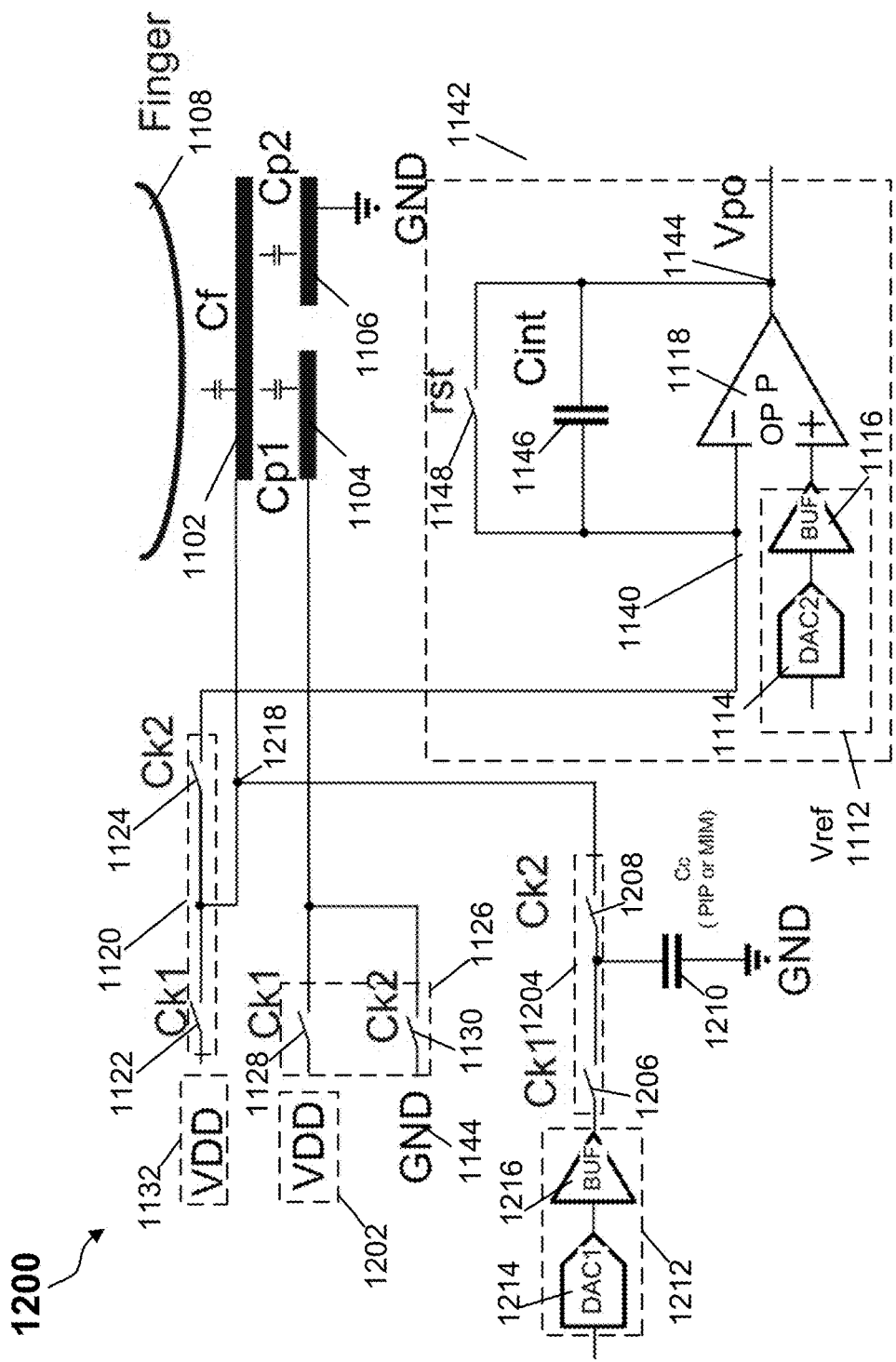
Figure 16:
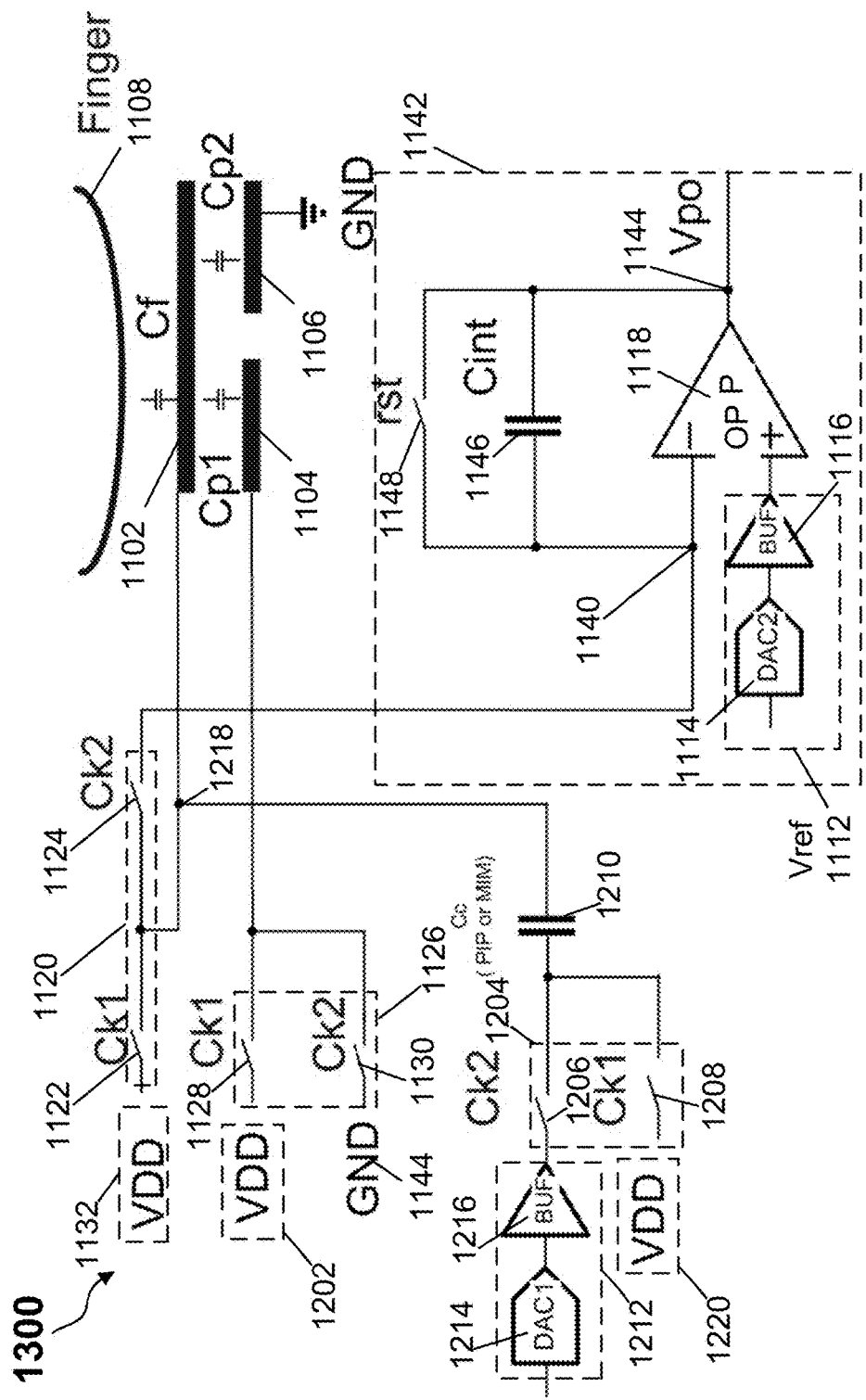

FIGS. 14, 15 and 16 show additional examples of capacitive fingerprint sensors that can be used for the design in FIG. 1A where each figure shows an example of a sensor pixel circuit. In those examples, each capacitive sensing pixel includes a single top sending electrode 1102 to interface with an input finger for sensing.

FIG. 14 is a diagram showing another exemplary sensor pixel circuitry 1100 for compensating for capacitor mismatch in a fingerprint identification system. The exemplary sensor pixel circuitry can include a sensor plate or a capacitive sensing layer 1102 that can operate or function as one of two opposing conductive plates of a fingerprint associated capacitor. For example, when a finger 1108 of a user approaches the sensor plate or capacitive sensing layer 1102, a surface of the finger 1108 and the sensor plate of capacitive sensing layer 1102 can operate or function as the two opposing plates of capacitor Cf. The capacitance of the capacitor Cf can vary based at least partly on a distance between the surface of the finger (e.g., a ridge) and the sensor plate or capacitive sensing layer 1102. The sensor plate or capacitive sensing layer 1102 can include a conductive material, such as one of various metals. A voltage generator 1132 is electrically connected to the sensor plate 1102, which is electrically connected to a system ground through the surface of the finger 108. The voltage generator can generate drive voltage VDD for charging the fingerprint associated capacitor Cf. A switching circuitry, such as a switching network 1120 includes switches 1122 and 1124 in series for being switchable in electrically connecting the sensor plate 1102 to the voltage generator 1132 and an output terminal 1140. In some implementations, the switching circuitry 1120 can be implemented using sample-and-hold circuitry.

The switches 1122 and 1124 can be controlled by a clock signal or other control signals, such that the switching circuitry 1120 can turn on an electrical connection between the voltage generator 1132 and the sensor plate 1102 by turning on the switch 1122 and turn off an electrical connection between the sensor plate 1102 and the output terminal 1140 by turning off the switch 1124 during a first period. During a second period, the sample-and-hold circuitry 1120 can turn off the electrical connection between the voltage generator 1132 and the sensor plate 1102 by turning off the switch 1122 and turn on the electrical connection between the sensor plate 1102 and the output terminal 1140 by turning on the switch 1124. Thus, switch 1122 operates as a charging switch and switch 1124 operates as a charge sensing switch to synchronously charge and sense capacitor Cf associated with the sensor plate 1102 during respective time periods.

Two substantially identical conductive layers, electrodes or plates 1104 and 1106 can be disposed below the sensor plate 1102. The conductive plate 1104 and the sensor plate 1102 can form a corresponding capacitor CP1. The conductive plate 1106 and the sensor plate 1102 can form a corresponding capacitor CP2.

When the two conductive plates 1104 and 1106 are substantially identical, the respective capacitors CP1 and CP2 can share a substantially similar capacitance. A switching circuitry, such as a switching network 1126 can include switches 1128 and 1130 to switchable between electrically connecting the conductive plate 1104 to a voltage generator 1134 and ground 1144. The other conductive plate 1106 is electrically connected to ground and not electrically controlled by the switching circuitry 1126. The voltage generator 1134 can include a DAC1 1136 and a voltage buffer 1138 to generate and provide a variable voltage to the conductive plates 1104. In some implementations, the switching circuitry 1126 can be implemented using sample-and-hold circuitry.

The switches 1128 and 1130 can be controlled by a clock signal or other control signals, such that the switching circuitry 1126 can turn on an electrical connection between the voltage generator 1134 and the conductive plate 1104 by turning on the switch 1128 and turn off an electrical connection between the conductive plate 1104 and the ground 1144 by turning off the switch 1130 during a first period. During a second period, the switching circuitry 1126 can turn off the electrical connection between the voltage generator 1134 and the conductive plate 1104 by turning off the switch 1128 and turn on the electrical connection between the conductive plate 1104 and the ground 1144 by turning on the switch 1130. Thus, switch 1128 operates as a charging switch and switch 1130 operates as a grounding switch to synchronously charge and ground capacitor CP1 associated with the sensor plate 1102 during respective time periods.

In some implementations, the output terminal 1140 can be optionally electrically connected to an integrator 1142 for storing the electric charges caused by ridges and valleys of a finger touching the passivation layer over the sensor plate 1102. The inclusion of the integrator INT enhances the signal-to-noise ratio (SNR). The integrator includes an amplifier 1118 having a negative input electrically connected to the output terminal 1140 connected to the switching circuitry 1120. The amplifier 1118 has a positive input electrically connected to a reference voltage generator 1112 for receiving the reference voltage Vref. The reference voltage generator 1112 can include a DAC2 1114 and a voltage buffer 1116 for generating and providing a variable reference voltage. The amplifier 1118 includes an output terminal 114 for outputting an output voltage Vpo. An integrating capacitor Cint 1146 and a reset switch rst 1148 are electrically coupled in parallel between the negative input terminal of the amplifier OP 1118 and the output terminal 1144.

When the two conductive plates 1104 and 1106 are substantially similar, the DAC1 1136 output can be set to VDD. During the first period CK1, the switches 1122 and 1128 are turned on and switches 1124 and 1130 are turned off. The charge in CP2 will be Cp2*VDD and the charge in CP1 will be 0. During the second period CK2, switches 1122 and 1128 are turned off and switches 1124 and 1130 are turned on. During the second period, the charges in CP1 and CP2 will exchange. When a finger is not touching a passivation layer over the sensor plate 1102, the charge in Cf is substantially zero, and the voltage at the negative input of the amplifier OP 1118 will be VDD/2. Because the two conductive plates 1104 and 1106 can be substantially the same due to the identical layout, the DAC1 might be not necessary or become optional. By removing the DAC1, the DAC1 noise will no longer exist in the pixel output, which further enhances the SNR.

Also, the mismatch between parasitic capacitors CP1 and CP2 can be compensated using techniques illustrated and described with respect to FIGS. 15 and 16.

FIG. 15 is a diagram showing yet another exemplary sensor pixel circuitry 1200 for compensating for capacitor mismatch in a fingerprint identification system. The sensor pixel circuitry 1200 is substantially similar to the sensor pixel circuitry 1100 with some variations. For example, the switching circuitry 1126 is electrically connected between the conductive plate 1104 and a voltage generator 1202 that does not include a DAC. The output of the voltage generator 1202 preset to VDD. In addition, a third voltage generator 1212 is electrically connected to another switching circuitry 1204. The third voltage generator 1212 can include a DAC 1214 DAC1 in series with a voltage buffer 1216.

The switching circuitry 1204 includes switches 1206 and 1208 in series for being switchable in electrically connecting a capacitor 1210 Cc between the voltage generator 1212 and a common node 1218 connecting to the sensor plate 1102 and the switching circuitry 1120 (which is switchable in electrically connecting to the output terminal 1140 and the voltage generator 1132). The other terminal of the capacitor 1210 Cc is electrically connected to ground. See relevant description of FIG. 11 for the circuit components of the sensor pixel circuitry 1200 that are similar to the sensor pixel circuitry 1100.

In the sensor pixel circuitry 1200, the final voltage VPO at the output terminal 1144 without a finger touching a passivation layer over the sensor electrode 1102 during the second period is (CP1*VDD+Cc*VDAC)/(Cc+Cp1+Cp2). When the two conductive plates 1104 and 1106 are substantially similar, VDAC is set to VDD/2. When two conductive plates 1104 and 1106 are not substantially similar, VDAC is adjusted.

FIG. 16 is a diagram showing yet another exemplary sensor pixel circuitry 1300 for compensating for capacitor mismatch in a fingerprint identification system. The sensor pixel circuitry 1300 is substantially similar to the sensor pixel circuitry 1200 with some variations. For example, the switching circuitry 1204 includes switches 1206 and 1208 electrically connected in series for selectively electrically connecting the capacitor Cc 1210 to the voltage generator 1202 and a fourth voltage generator 1220. The voltage generator 1220 can be set to VDD. The other terminal of the capacitor Cc 1210 is electrically connected to a common node 1218 connecting to the sensor plate 1102 and the sample-and-hold circuitry 1120 (which is switchable in electrically connecting to the output terminal 1140 and the voltage generator 1132). See descriptions of FIG. 14 for the corresponding descriptions of the circuit components of the sensor pixel circuitry 1300 that are similar to the sensor pixel circuitry 1200.

In the sensor pixel circuitry 1300, the final voltage VPO at output terminal 1144 without a finger touch during the second period Ck2 is (CP1*VDD+Cc*Vdac)/(Cc+Cp1+Cp2). When two conductive plates 1104 and 1106 are not substantially similar, VDAC is adjusted.

In some implementations, an integrator can be shared between a number of sensor pixel circuitry units to reduce the total number of integrators in the fingerprint identification system, which can provide a number potential advantages including cost reduction, layout size reduction, and simplicity in design, for example. Multiple units of sensor pixel circuitry can share an integrator by multiplexing the output signals from a selected number of sensor pixel circuitry units into a shared integrator. For example, when grouping the array of sensor pixel circuitry units into rows, with each row assigned to an ADC, each sensor pixel circuitry unit in a row can share an integrator with one or more sensor pixel circuitry units in one or more rows of sensor pixel circuitry. When grouping the sensor pixel circuitry in the array of sensor pixel circuitry into columns, each sensor pixel circuitry in a given column can share an integrator with one or more sensor pixel circuitry in one or more columns.

The disclosed technology can be applied to implement the fingerprint sensor in smartphones, tablets, laptops, portable game machines, portable controllers, and other electronic devices that uses secure access.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint sensor device, comprising:
    a touch panel with an integrated touch sensor module, the integrated touch sensor module including:
        sensing circuitry to generate a sensor signal responsive to detecting a contact input associated with a fingerprint, the sensing circuitry including:
            a capacitive fingerprint sensor to detect the contact input and generate a signal indicative of an image of the fingerprint as part of the sensor signal, and
            an optical biometric sensor to generate a signal indicative of a biometric marker different from the fingerprint as part of the sensor signal; and
        processing circuitry communicatively coupled to the sensing circuitry to process the generated sensor signal to determine whether the contact input associated with the fingerprint belongs to a finger of a live person,
    wherein:
        the optical biometric sensor includes a light source configured to emit probe light toward a location of the contact input and to generate signal light carrying information associated with the contact input including ridges and valleys of a finger when the finger is the contact input;
        the capacitive fingerprint sensor includes an array of capacitive sensing pixels for sensing different parts of the contact input to generate pixel signals that are collectively indicative of an image of the fingerprint;
        the optical biometric sensor includes an array of optical sensors that are distributed in the array of capacitive sensing pixels of the capacitive fingerprint sensor, one optical sensor per capacitive sensing pixel, each optical sensor operable to capture scattered light from a respective part of the contact input to produce an optical sensor output, wherein optical sensor outputs from the optical sensors collectively form a second image of the fingerprint and are further indicative of the biometric marker different from the fingerprint; and
        the optical biometric sensor includes optical collimators distributed over the array of optical sensors, wherein each optical collimator is located to collect scattered light from a respective part of the contact input to a corresponding optical sensor.

2. The fingerprint sensor device of claim 1, wherein:
the optical biometric sensor includes (1) one or more light sources to produce probe light to illuminate a location of the contact input and to generate signal light carrying information associated with the contact input including ridges and valleys of a finger when the finger is the contact input, and (2) optical sensors distributed at different locations to receive the signal light from the location of the contact input to produce optical sensor signals that collectively represent the biometric marker different from the fingerprint.

3. The fingerprint sensor device of claim 2, wherein:
the optical sensors are at different distances from the one or more light sources.

4. The fingerprint sensor device of claim 2, wherein:
the optical sensors are located near and outside the capacitive fingerprint sensor.

5. The fingerprint sensor device of claim 2, wherein:
the optical sensors are located within and integrated to the capacitive fingerprint sensor.

6. The fingerprint sensor device of claim 5, wherein:
at least one optical sensor is located at or near a central area of the capacitive fingerprint sensor.

7. The fingerprint sensor device of claim 6, wherein each of other optical sensors is located near an edge of the capacitive fingerprint sensor.

8. The fingerprint sensor device of claim 2, wherein:
the one or more light sources produce the probe light at different optical wavelengths at which the blood exhibits different optical absorption levels; and
the processing circuitry processes optical absorption information at the different optical wavelengths from the optical sensors to determine whether the contact input associated with the fingerprint belongs to a finger of a live person.

9. The fingerprint sensor device of claim 2, wherein:
the processing circuitry processes the optical sensor signals from the optical sensors at the different locations to determine whether the contact input contains a non-human tissue material at the location of the contact input.

10. The fingerprint sensor device of claim 9, wherein:
the processing circuitry processes a signal ratio of the optical sensor signals from two different optical sensors at two different locations to determine whether the contact input contains a non-human tissue material at the location of the contact input.

11. A fingerprint sensor device, comprising:
a touch panel with an integrated touch sensor module, the integrated touch sensor module including:
   sensing circuitry to generate a sensor signal responsive to detecting a contact input associated with a fingerprint, the sensing circuitry including:
      a capacitive fingerprint sensor to detect the contact input and generate a signal indicative of an image of the fingerprint as part of the sensor signal, and
      an optical biometric sensor to generate a signal indicative of a biometric marker different from the fingerprint as part of the sensor signal; and
   processing circuitry communicatively coupled to the sensing circuitry to process the generated sensor signal to determine whether the contact input associated with the fingerprint belongs to a finger of a live person,
wherein the optical biometric sensor includes optical collimators distributed over an array of optical sensors, wherein each optical collimator is located to collect scattered light from a respective part of the contact input to a corresponding optical sensor,
wherein the optical biometric sensor includes a light source configured to emit probe light toward a location of the contact input and to generate signal light carrying information associated with the contact input including ridges and valleys of a finger when the finger is the contact input,
wherein the capacitive fingerprint sensor includes an array of capacitive sensing pixels for sensing different parts of the contact input to generate pixel signals that are collectively indicative of an image of the fingerprint, and
wherein the array of optical sensors is distributed in the array of capacitive sensing pixels of the capacitive fingerprint sensor, one optical sensor per capacitive sensing pixel, each optical sensor operable to capture scattered light from a respective part of the contact input to produce an optical sensor output, wherein optical sensor outputs from the optical sensors collectively form a second image of the fingerprint.

12. The fingerprint sensor device of claim 11, wherein the touch panel includes multiple layers including a display screen and the integrated sensor module is packaged adjacent to the display screen.

13. The fingerprint sensor device of claim 11, wherein the optical biometric sensor is configured to generate the signal indicative of the biometric marker including a person's heartbeat.

14. The fingerprint sensor device of claim 11, wherein the optical biometric sensor is configured to generate the signal indicative of the biometric marker including a parameter of a person's blood flow.

15. The fingerprint sensor device of claim 11, wherein the processing circuitry is configured to analyze the signal indicative of the image of the fingerprint to identify dynamic changes in image details over a period of time.

16. The fingerprint sensor device of claim 11, wherein
the optical sensors are distributed at different locations to receive the signal light from the location of the contact input to produce optical sensor signals that collectively represent the biometric marker different from the fingerprint.

17. The fingerprint sensor device of claim 16, wherein:
the optical sensors are at different distances from the one or more light sources.

18. The fingerprint sensor device of claim 16, wherein:
the optical sensors are located within and integrated to the capacitive fingerprint sensor or near and outside the capacitive fingerprint sensor, or at least one optical sensor is located at or near a central area of the capacitive fingerprint sensor.

19. The fingerprint sensor device of claim 18, wherein:
each of other optical sensors is located near an edge of the capacitive fingerprint sensor.

20. The fingerprint sensor device of claim 16, wherein:
the one or more light sources produce the probe light at different optical wavelengths at which the blood exhibits different optical absorption levels; and
the processing circuitry processes optical absorption information at the different optical wavelengths from the optical sensors to determine whether the contact input associated with the fingerprint belongs to a finger of a live person.

21. The fingerprint sensor device of claim 16, wherein:
the processing circuitry processes the optical sensor signals from the optical sensors at the different locations to determine whether the contact input contains a non-human tissue material at the location of the contact input.

22. The fingerprint sensor device of claim 21, wherein:
the processing circuitry processes a signal ratio of the optical sensor signals from two different optical sensors at two different locations to determine whether the contact input contains a non-human tissue material at the location of the contact input.

\* \* \* \* \*